United States Patent
Bradford et al.

(10) Patent No.: US 10,077,123 B2
(45) Date of Patent: Sep. 18, 2018

(54) METHOD OF USING CONTAINER HAVING DUNNAGE COMPONENTS MOVABLE ALONG GUIDES

(71) Applicant: Bradford Company, Holland, MI (US)

(72) Inventors: Judson A. Bradford, Holland, MI (US); Timothy A. Bublitz, Grand Haven, MI (US); Brian T. Dobrinski, Zeeland, MI (US); Matthew S. Sanger, West Olive, MI (US)

(73) Assignee: Bradford Company, Holland, MI (US)

( * ) Notice: Subject to any disclaimer, the term of this patent is extended or adjusted under 35 U.S.C. 154(b) by 357 days.

(21) Appl. No.: 14/962,033

(22) Filed: Dec. 8, 2015

(65) Prior Publication Data

US 2016/0090200 A1   Mar. 31, 2016

Related U.S. Application Data

(62) Division of application No. 13/956,469, filed on Aug. 1, 2013, now Pat. No. 9,540,125.

(51) Int. Cl.
*B65B 5/10* (2006.01)
*B65D 65/00* (2006.01)
(Continued)

(52) U.S. Cl.
CPC ............ *B65B 5/10* (2013.01); *B65D 19/0028* (2013.01); *B65D 19/18* (2013.01); *B65D 65/10* (2013.01); *B65G 65/00* (2013.01); *B65D 2519/00034* (2013.01); *B65D 2519/00069* (2013.01); *B65D 2519/00174* (2013.01); *B65D 2519/00273* (2013.01); *B65D 2519/00288* (2013.01);
(Continued)

(58) Field of Classification Search
CPC .... B65D 25/10; B65D 25/102; B65D 25/103; B65D 25/107; B65D 25/108; B65D 19/0028; B65D 19/18; B65D 65/00; B65D 65/10; B65D 2519/00034; B65D 2519/00069; B65D 2519/00174; B65D 2519/00273; B65D 2519/00288; B65D 2519/00338; B65D 2519/00502; B65D 2519/00567; B65D 2519/00621; B65D 2519/00666; B65D 2519/00796; B65D 2519/00815; B65B 5/10
See application file for complete search history.

(56) References Cited

U.S. PATENT DOCUMENTS 4,685,571 A   8/1987   Hoss
4,712,691 A   12/1987  Grill et al.
(Continued)

FOREIGN PATENT DOCUMENTS

WO   2015017408   2/2015

*Primary Examiner* — Saul Rodriguez
*Assistant Examiner* — Ashley K Romano
(74) *Attorney, Agent, or Firm* — Wood, Herron & Evans, LLP

(57) ABSTRACT

A container for holding product therein during shipment and being returned for reuse has a base and opposed sides. The container has multiple levels of dunnage components, the dunnage components of at least one level being movable between open and closed positions to enable an operator to load and unload products more easily. The dunnage components of at least one level may have openings through which pass guides supported at least partially by the container.

20 Claims, 28 Drawing Sheets

(51) Int. Cl.
*B65D 65/10* (2006.01)
*B65D 19/00* (2006.01)
*B65D 19/18* (2006.01)
*B65G 65/00* (2006.01)

(52) U.S. Cl.
CPC ............ *B65D 2519/00338* (2013.01); *B65D 2519/00502* (2013.01); *B65D 2519/00567* (2013.01); *B65D 2519/00621* (2013.01); *B65D 2519/00666* (2013.01); *B65D 2519/00796* (2013.01); *B65D 2519/00815* (2013.01)

(56) References Cited

U.S. PATENT DOCUMENTS

| | | | |
|---|---|---|---|
| 4,919,277 | A | 4/1990 | Jeruzal |
| 5,025,979 | A * | 6/1991 | Dellacroce .......... B42F 15/0035 229/67.2 |
| 5,324,105 | A | 6/1994 | Christensen |
| 5,605,239 | A | 2/1997 | DeVoursney et al. |
| 6,123,208 | A | 9/2000 | Haenszel |
| 6,352,157 | B1 * | 3/2002 | Srinivasan .......... B42F 15/0094 206/425 |
| 7,128,509 | B2 | 10/2006 | Farley et al. |
| 7,140,498 | B2 * | 11/2006 | Pippin ...................... B07C 3/00 211/12 |
| 7,322,479 | B2 | 1/2008 | Kaltz, Jr. et al. |
| 7,644,831 | B2 | 1/2010 | Vroon |
| 7,748,559 | B2 | 7/2010 | Bradford |
| 7,762,422 | B2 | 7/2010 | Dobrinski |
| 8,308,015 | B2 | 11/2012 | Bradford et al. |
| 9,422,081 | B2 * | 8/2016 | Bublitz ................. B65D 90/12 |
| 2004/0007544 | A1 * | 1/2004 | MacKelvie .......... B42F 15/023 211/40 |
| 2004/0131441 | A1 | 7/2004 | Kessler |
| 2005/0011801 | A1 | 1/2005 | Kaltz, Jr. et al. |
| 2006/0249514 | A1 | 11/2006 | Bazany et al. |
| 2008/0023470 | A1 | 1/2008 | Bradford |
| 2008/0237225 | A1 | 10/2008 | Owen |
| 2013/0239526 | A1 | 9/2013 | Bazany et al. |

* cited by examiner

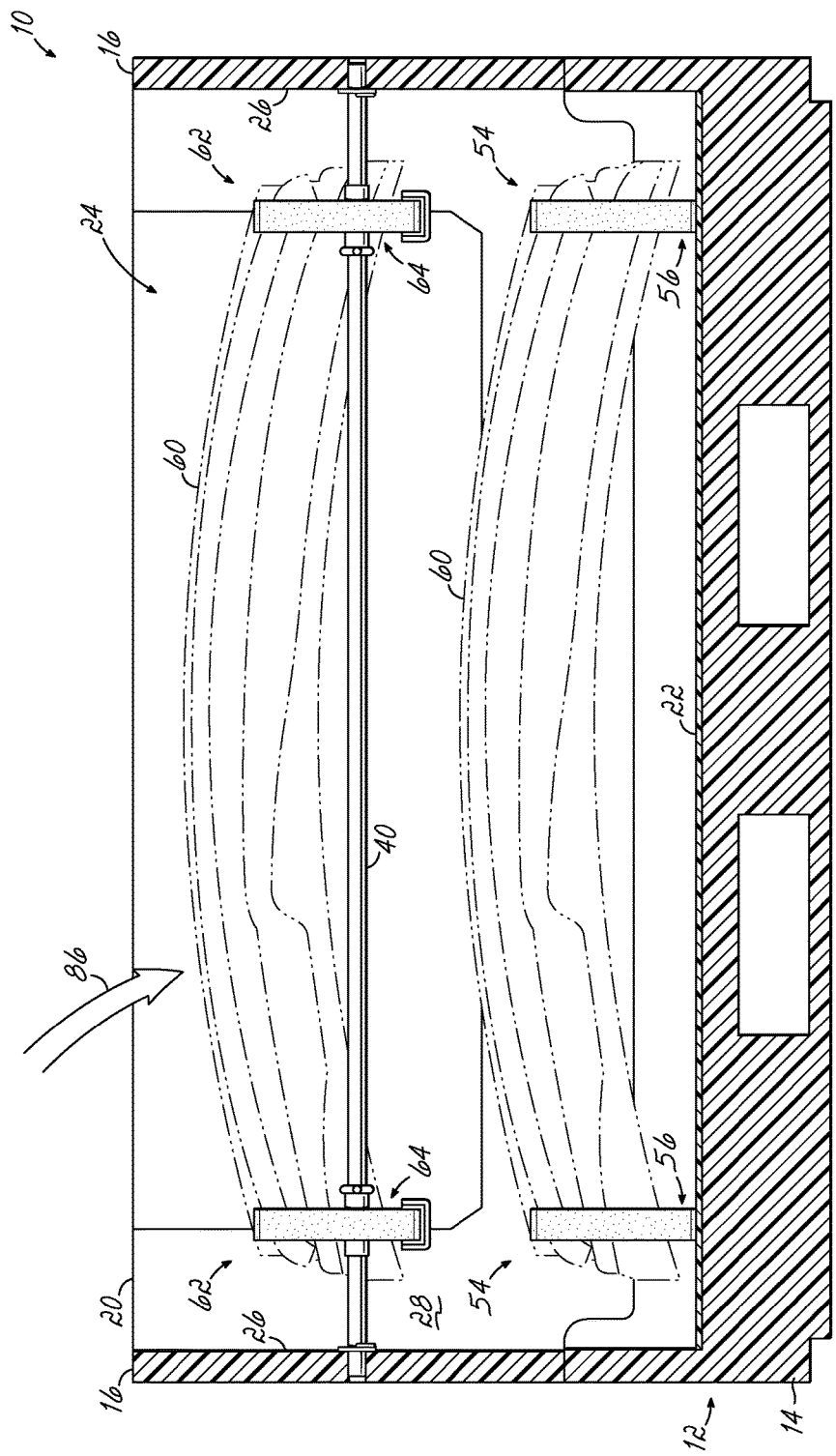

METHOD OF USING CONTAINER HAVING DUNNAGE COMPONENTS MOVABLE ALONG GUIDES

CROSS-REFERENCE TO RELATED APPLICATIONS

This application is a divisional application of U.S. patent application Ser. No. 13/956,469 filed Aug. 1, 2013, which is fully incorporated by reference herein.

FIELD OF THE INVENTION

The present invention relates to containers for use in shipping and, more particularly, to containers with movable dunnage for supporting product during shipment and/or storage.

BACKGROUND OF THE INVENTION

Different container structures are utilized by manufacturers to ship a variety of different products to end users which may be, for example, assembly plants. In the automobile industry, for example, an assembly plant assembling a particular automobile might utilize a number of different parts from different manufacturers. These manufacturers ship their respective parts to the assembly plant in container structures where the parts are then removed from dunnage or support members inside the container structure and assembled into a finished automobile.

Access to the product in the containers is of particular concern. Specifically, in the automotive industry, the containers full of product are positioned on an assembly line adjacent to a work area, which is associated with a particular product to be installed on a manufactured vehicle. For example, a container full of interior door panels is usually positioned next to a particular station on an assembly line where interior door panels are installed so that a line worker may easily access the door panels inside the container. The product or part is taken directly from the container and used on the line. Some existing containers are difficult to access, which makes removal of the parts therein difficult and time consuming. For example, some containers are configured so that a line worker must walk around the container to remove parts or products from opposite ends of the container. As may be appreciated, a line worker only has a certain amount of time to install a part. Any delay in access and removal of the part from the container is undesirable.

In many containers, a line worker or employee must insert or remove parts from a lower part of the container. Sometimes the size and/or weight and/or configuration of the parts or work pieces may make inserting or removing such parts from a lower level of the container difficult due, in part, to the configuration or location of the dunnage inside the container. Such difficulty may cause stress or strain on the line worker and, more particularly, on the back of the worker when inserting or removing parts from the lower part of such a container. Such ergonomically unfriendly movements may cause physical trauma, pain and other injuries that may lead to lost production time.

Therefore, there is a need for a container with movable dunnage inside the container so an operator may more easily load or unload parts from inside the container. Such movable dunnage may alleviate stress and/or strain on the operator's body during loading and/or unloading processes.

Containers having movable dunnage in the form of pouches are known. Such containers may be adapted to store and ship parts residing inside the pouches. Some parts or products are more easily, cost effectively and/or safely shipped/stored in dunnage other than pouches.

Accordingly, there is a need for a container having movable dunnage in a form other than pouches.

There is further a need for a container having multiple levels of dunnage other than pouches in order to ship additional parts or products.

SUMMARY OF THE INVENTION

The present invention provides a container for holding product therein during shipment and/or storage that has a body and upper and lower levels of dunnage components supported, at least in part, by the body. For purposes of this document, the term dunnage component refers to both a single dunnage member and multiple pieces or members joined together into a dunnage assembly. In some embodiments, at least one movable dunnage component may move above at least one stationary dunnage component for ease of loading/unloading products into the dunnage for shipment or storage. In some embodiments, two movable upper dunnage components may be moved away from each other or separated in order to aid the loading or unloading of parts into or out of the lower level of dunnage. Separating the upper dunnage components increases the size of an opening through which a part must pass to be loaded into the lower level of dunnage or unloaded from the lower level of dunnage. In other embodiments, only one of the two upper dunnage components may be movable.

According to one aspect of the present invention, the container has a base and at least two opposed walls or side structures. The container further comprises upper and lower levels of dunnage for holding products during storage and shipment. The lower level of dunnage is often stationary, but may be movable in certain applications. The upper level of dunnage components may be at least partially movable to facilitate insertion and removal of products from an interior of the container. Supports are operatively coupled to opposed side structures of the container and guides supported by the supports. The upper level of dunnage comprises multiple dunnage components. The guides direct at least one of the upper dunnage components to a desired position away from another dunnage component to facilitate insertion and removal of products from the lower level of dunnage.

At least one of the dunnage components may include a dunnage member made at least partially of foam. Any other material, such as plastic or wood, may be used for the dunnage components of either level.

The container guides may be rails, beams, rods or tubes made of metal, such as aluminum, or any other suitable material. The guides may extend the length or width of the interior of the container. Alternatively, each of the guides may be less than the length or width of the container's interior.

According to another aspect of the invention, the container comprises a base and at least two opposed side structures. The container further comprises supports operatively coupled to opposed side structures of the container. The container has multiple levels of dunnage for holding products during storage and shipment. At least one level of dunnage may be stationary. At least one level of dunnage may be at least partially movable to facilitate insertion and removal of products into and out of a lower level of dunnage. Guides may be supported by the supports, the guides directing at least one dunnage component of the upper level of dunnage to a desired position to facilitate removal or insertion of products into and out of the lower level of dunnage. The upper level of dunnage may comprise two dunnage components, each of the upper dunnage components having at least one opening which one of the guides passes, such that the upper dunnage component may be guided to a desired position.

According to another aspect of the invention, a method of unloading products from inside a container is disclosed. The method comprises removing products extending between movable dunnage components of an upper level of dunnage. At least one of the dunnage components of the upper level of dunnage is movable away from another dunnage component of the upper level of dunnage. The next step comprises moving at least one of the dunnage components of the upper level of dunnage from a first position to a second position, the dunnage components of the upper level of dunnage being further away from each other in the second position than in the first position. The next step comprises removing products of a lower level of dunnage while the dunnage components of the upper level of dunnage are in their second position.

According to another aspect of the invention, a method of loading products into a container is disclosed. The method comprises inserting products into a lower level of dunnage while dunnage components of an upper level of dunnage are spaced away from each other in an open position. At least one of the dunnage components of the upper level of dunnage is movable away from another of the dunnage components of the upper level of dunnage. The next step comprises moving the dunnage components of the upper level of dunnage towards each other into a closed position. The last step comprises inserting products into notches into the upper level of dunnage.

According to another aspect of the invention, a method of loading products into a container is disclosed. The method comprises inserting products into a lower level of dunnage while dunnage components of an upper level of dunnage are spaced away from each other in an open position. The next step comprises moving the dunnage components of the upper level of dunnage towards each other into a closed position. The last step comprises inserting products into the dunnage components of the upper level of dunnage.

According to another aspect of the invention, a method of unloading products from inside a container is disclosed. The method comprises removing products from an upper level of dunnage. The next step comprises moving the dunnage components of the upper level of dunnage from a first position to a second position, the dunnage components of the upper level of dunnage being further away from each other in the second position than in the first position. The last step comprises removing products from a lower level of dunnage while the dunnage components of the upper level of dunnage are in their second position.

The container may have at least one door. The movable dunnage of the upper level allows product to be more efficiently and safely removed from the container or inserted therein without unnecessary stress or strain on the operator. Although the containers shown and described herein contain two levels or layers of dunnage, the container may have three or more layers or levels of dunnage.

The ease of operation and other objects and advantages of the present invention shall be made apparent from the accompanying drawings and the brief description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 6F is a cross-sectional view of the container shown in FIG. 6D, the dunnage components of the upper level being shown in a closed position and products being loaded into the dunnage of the upper level;

DETAILED DESCRIPTION OF THE DRAWINGS

Figure 1:
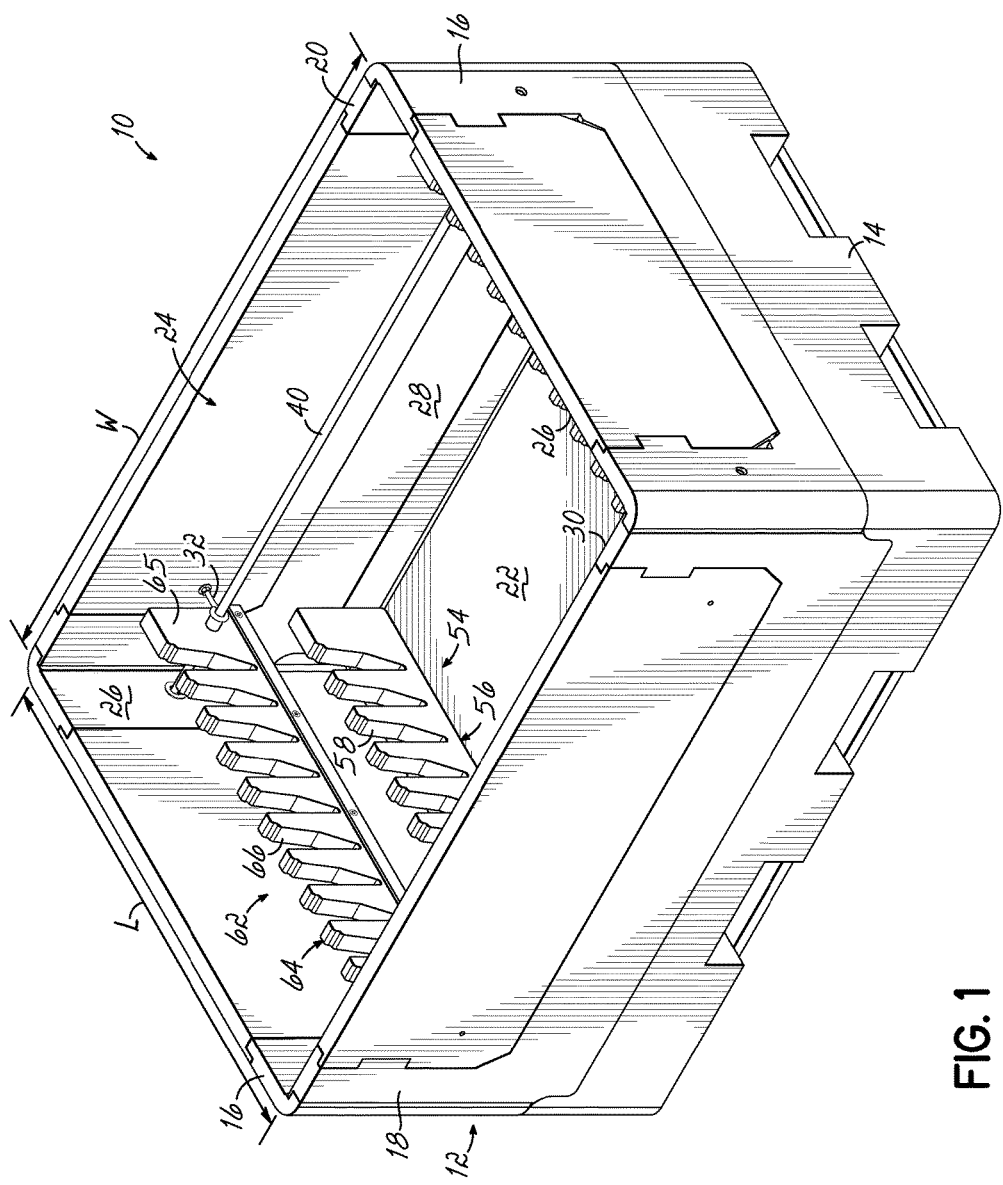
FIG. 1 is a perspective view of one embodiment of a reusable and returnable container.

Referring to FIG. 1, there is illustrated a reusable and returnable container 10 according to one embodiment. The reusable and returnable container 10, as shown, comprises a body 12 having a base 14, opposed side walls 16, a front wall 18 and a rear wall 20, all of the walls or side structures extending upwardly from the base 14. Two or more of the walls or sides 16, 18 and 20 may or may not be hingedly secured to the base 14.

The base 14 has an upper surface which functions as a floor 22 of the interior 24 of the container. Each of the side walls 16 has an inner surface 26. The rear wall 20 has an interior surface 28 and the front wall 18 has an interior surface 30. The floor 22, interior surfaces 26 of side walls 16 and interior surfaces 30, 28 of the front and rear walls 18, 20, respectively, define the interior 24 of the container 10. The linear distance between the interior surfaces 26 of the side walls 16 defines a width "W" of the interior of the container. The linear distance between the interior surfaces 30, 28 of the front and rear walls 18, 20, respectively, defines a length "L" of the interior 24 of the container 10. See FIG. 1.

The present invention is not intended to limit the size or configuration of the container base and walls. Although one type of container is illustrated, the present invention may be used with other types or configurations of container.

Figure 2:
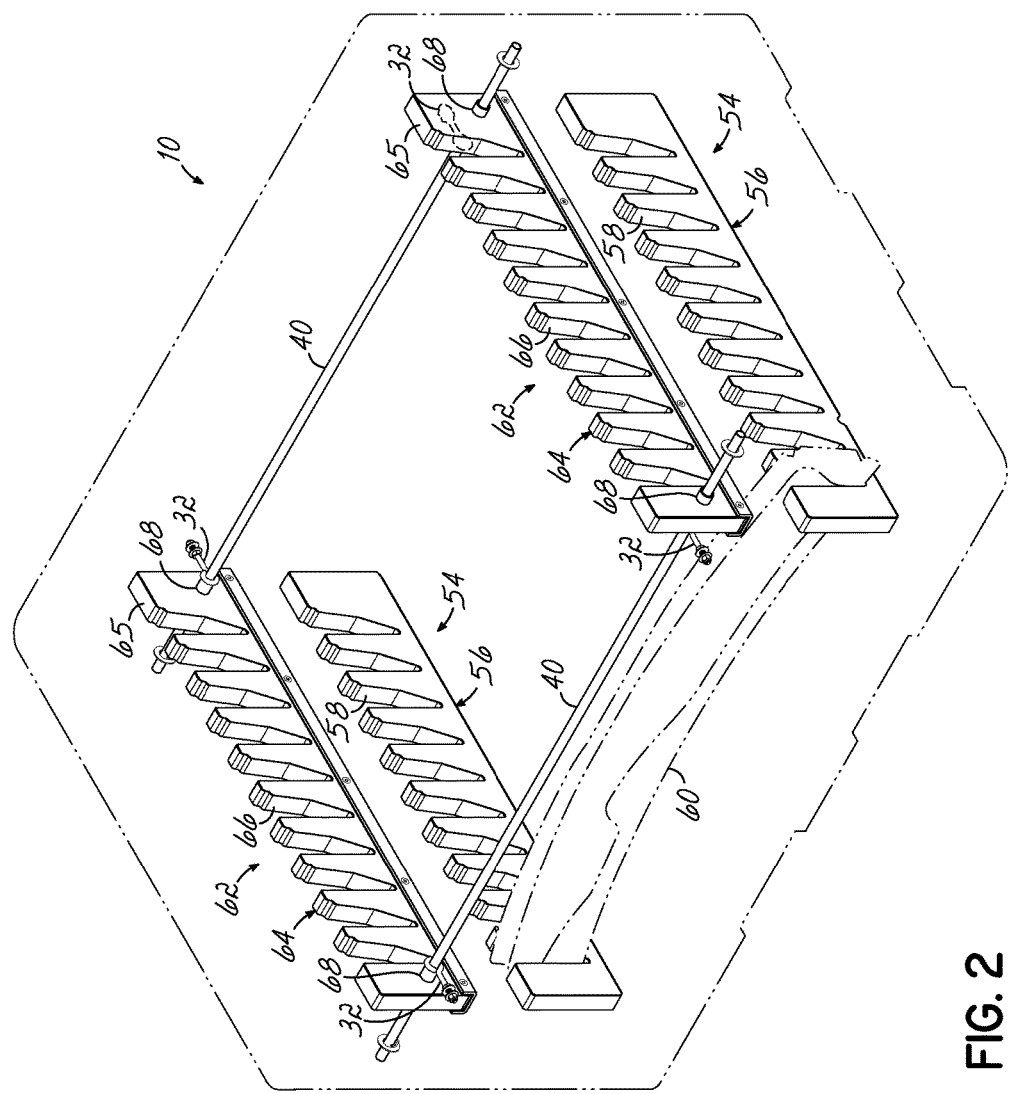
FIG. 2 is a perspective view of the container of FIG. 1 showing the dunnage inside the container.

Container 10 further comprises a pair of spaced stationary supports 32 operatively coupled to the rear wall 20 of the container 10 (only one being shown in FIG. 1). For purposes of this document, operatively coupled means directly or indirectly connected or coupled. FIG. 2 illustrates a pair of spaced stationary supports 32 operatively coupled to the front wall 18 of the container 10. Each of the supports 32 do not move during the loading or unloading processes. Each support 32 is illustrated in the embodiment shown in FIGS. 1-4 to be a guide eye, such as an eye bolt fixedly secured to a container wall. However, as shown in the alternative embodiments and described herein, these supports may assume other geometries or configurations. Although the drawings illustrate a pair of spaced supports 32 operatively coupled to each of the front and rear sides 18, 20 of the container 10, any number of supports may be operatively coupled to the sides of the container.

Figure 3:
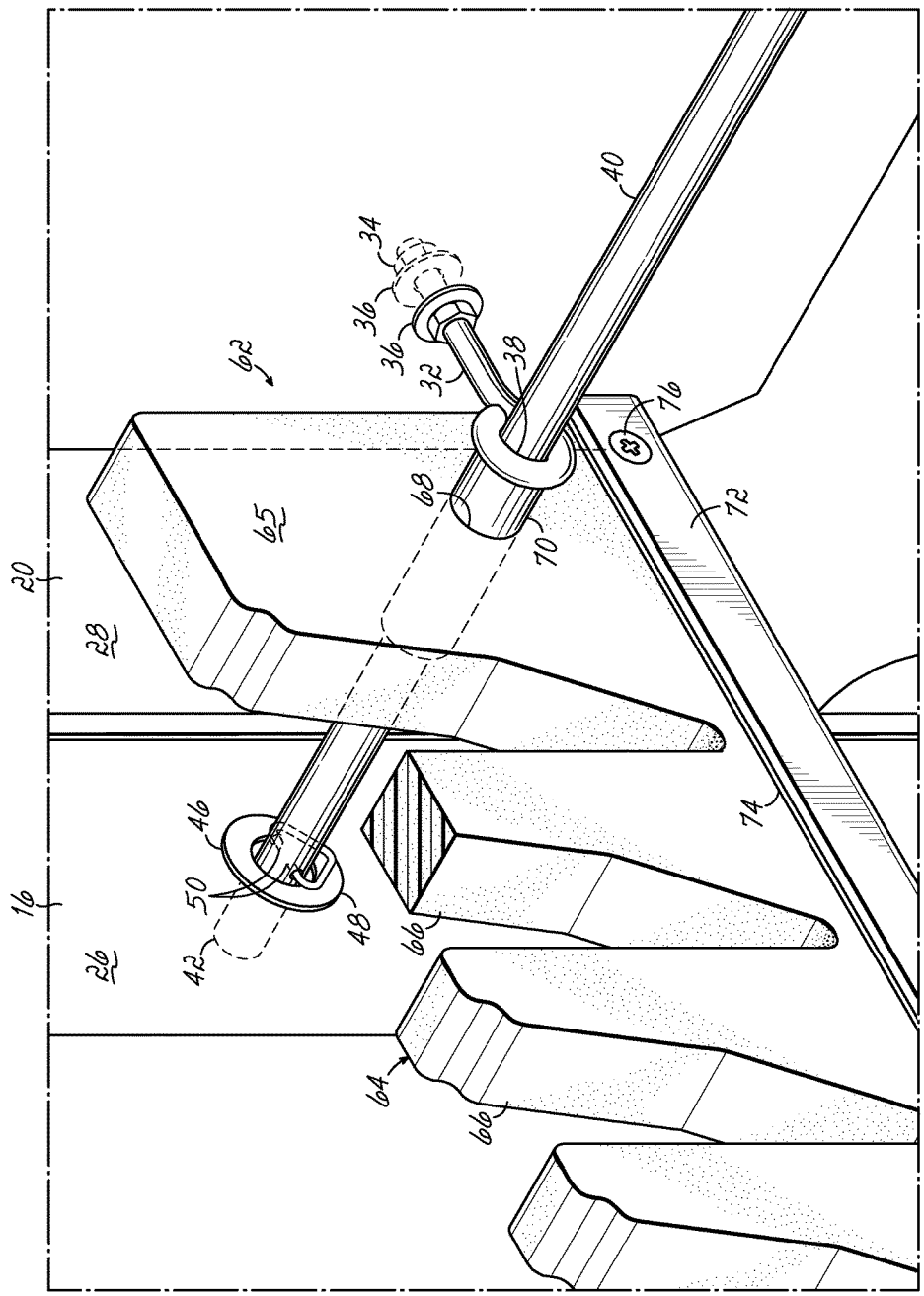
FIG. 3 is an enlarged perspective view of a portion of the container shown in FIGS. 1 and 2.

As shown in FIG. 3, each of the supports or guide eyes 32 extends through the container side structure and may be secured in place with a nut 34 and washers 36 on each side of the container side structure.

Figure 4:
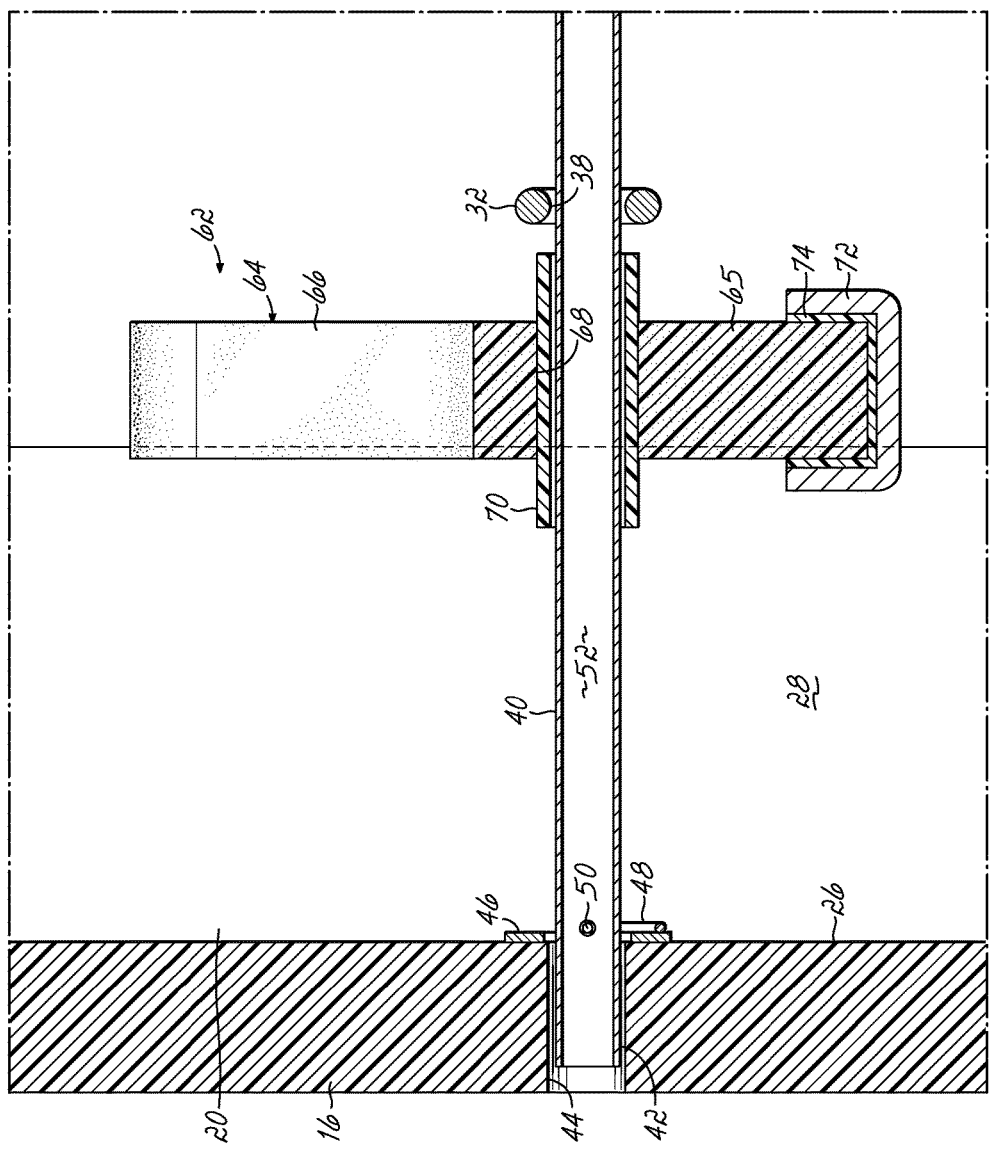
FIG. 4 is a partial cross-sectional view of a portion of the container shown in FIG. 1.

As shown in FIGS. 1-4, container 10 further comprises two guides 40. One of the guides 40 extends through an opening 38 through each of the supports or eye bolts 32 secured to the rear wall 20 of the container 10. Similarly, as best shown in FIG. 2, the second guide 40 extends through an opening 38 of each of the supports or eye bolts 32 secured to the front wall 18 of the container 10. As shown in FIG. 3, each of the guides 40 has a length greater than the width "W" of the interior 24 of the container 10. Therefore, as shown in FIGS. 3 and 4, each guide 40 has opposed end portions 42 (only one being shown). As shown in FIGS. 3 and 4, each end portion 42 of each guide 40 extends into a bore 44 in one of the container side walls 16. As shown in FIGS. 3 and 4, a washer 46 is located inside the container side wall 16 surrounding the guide 40. As best shown in FIG. 3, a holder 48 in the form of a triangular metal wire has two ends 50 which fit into holes in the guide 40. The holder 48 at each end of each guide 40 functions to hold each guide 40 in place. The pair of holders 48, acting in concert, functions to prevent the guide 40 from separating from the container side walls 16. As shown in FIG. 3, the holder 48 (shown on the left of the container) functions to prevent the guide 40 to which the holder 48 is secured from moving further to the left, such that the right side of the guide 40 separates from the opposite side wall 16. The other guide 48 proximate the side wall 16 (shown on the right of the container) functions to prevent the guide 40 from moving to the right, such that the left side of the guide 40 separates from the opposite side wall 16. Although one configuration of holder in the form of a triangular metal wire is shown and described, other types of holders, such as wires or pieces of other materials configured in other shapes, may be used.

As shown in FIG. 4, each of the guides 40 are in the form of a tube having a hollow interior 52. Although one configuration of guide in the form of a tube is shown and described, other types of guides, such as solid rods made of metal or plastic or wood, or any other desired material, may be used.

As shown in FIGS. 1-4, container 10 further comprises a lower level of dunnage 54 which may be fixedly secured to the floor 22 of the container. This lower level of dunnage 54 comprises a pair of stationary dunnage components 56 spaced from one another. Each stationary dunnage component 56 has a plurality of spaced notches 58 extending downwardly from an upper surface of the dunnage component 56. The notches 58 are for receiving and retaining products 60, as shown in FIG. 2, one of the products 60 extending between a pair of corresponding notches 58 in the stationary dunnage component 56. Although one specific shape of notch 58 is illustrated in the drawings, this document is not intended to limit in any way the size, shape or configuration of notches 58 in any of the dunnage components 56 of the lower level of dunnage 54. If desired, more than two dunnage components may comprise the lower level of dunnage 54. Alternatively, a single dunnage component or member may comprise the lower level of dunnage 54.

Although one specific shape of product 60 is illustrated in the drawings, this document is not intended to limit in any way the size, shape or configuration of product 60 shipped or stored in any of the embodiments described or shown herein. One type of product which may be used in accordance with the present invention is car fenders.

Figure 6A:
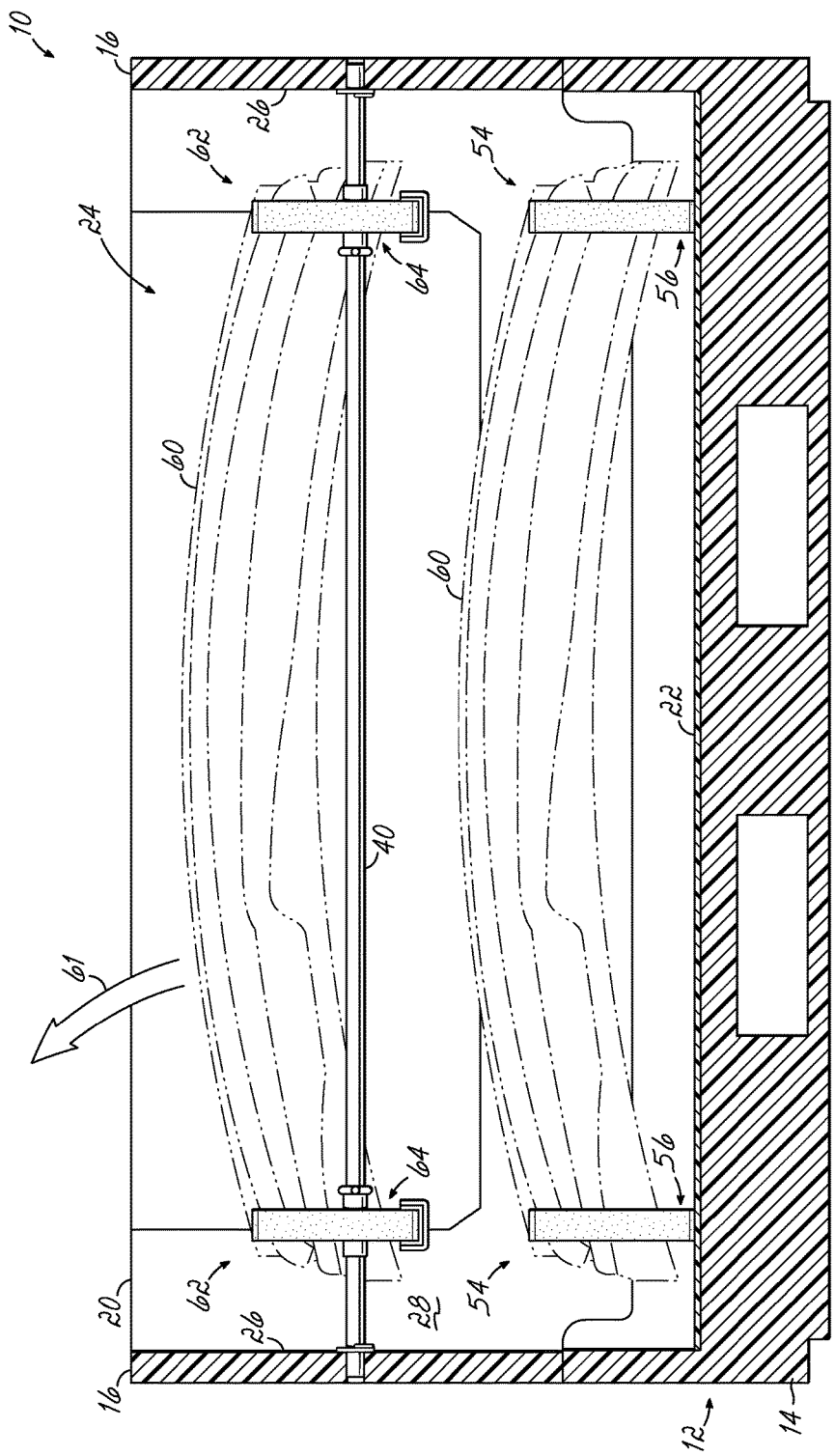
FIG. 6A is a cross-sectional view of the container shown in FIG. 1, the dunnage components of the upper level being shown in a closed position and products being shown in dashed lines.

As shown in FIGS. 1-4, container 10 further comprises an upper level of dunnage 62 which is movable inside the interior 24 of the container. This upper level of dunnage 62 comprises a pair of movable dunnage components 64 spaced from one another. Each of the movable dunnage components 64 moves between one of the container side walls 16 and one of the supports 32. Each movable dunnage component 64 has a plurality of spaced notches 66 for receiving and retaining products 60, as shown in FIG. 6A. Although one specific shape of notch 66 is illustrated in the drawings, this document is not intended to limit in any way the size, shape or configuration of notches 66 in any of the dunnage components 64 of the upper level of dunnage 62.

As shown in FIGS. 2-4, each of the dunnage components 64 of the upper level of dunnage 62 has a main portion or body 65 having a pair of openings 68, one on each end. The body 65 is commonly made of foam, but may be made of other materials. As best shown in FIG. 4, a sleeve 70 extends through each opening 68 in the dunnage body 65 of the dunnage component 64 and moves with the dunnage component 64. Each sleeve 70 is sized to allow one of the guides 40 to extend through the sleeve 70. If desired, the sleeves 70 may be omitted.

As shown in FIGS. 2-4, each of the dunnage components 64 of the upper level of dunnage 62 also has a stiffener 72 and a liner 74, the liner 74 being between the stiffener 72 and body 65 of dunnage component 64. As best shown in FIG. 4, the stiffener 72 and liner 74 of the upper dunnage component 64 are each generally "U-shaped" and fit around a lower portion of the body or dunnage body 65 of upper dunnage component 64. The stiffener 72 may be made of foam, metal and/or plastic and provides rigidity in two directions to the dunnage component 64. The liner 74 may be made of metal and/or plastic and provides rigidity in two directions to the dunnage component 64. As shown in FIG. 3, fasteners 76 secure the body 65 of upper dunnage component 64, the liner 74 and stiffener 72 together. If desired, the stiffener 72 and/or liner 74 of the upper dunnage component 64 may be omitted.

Figure 5:
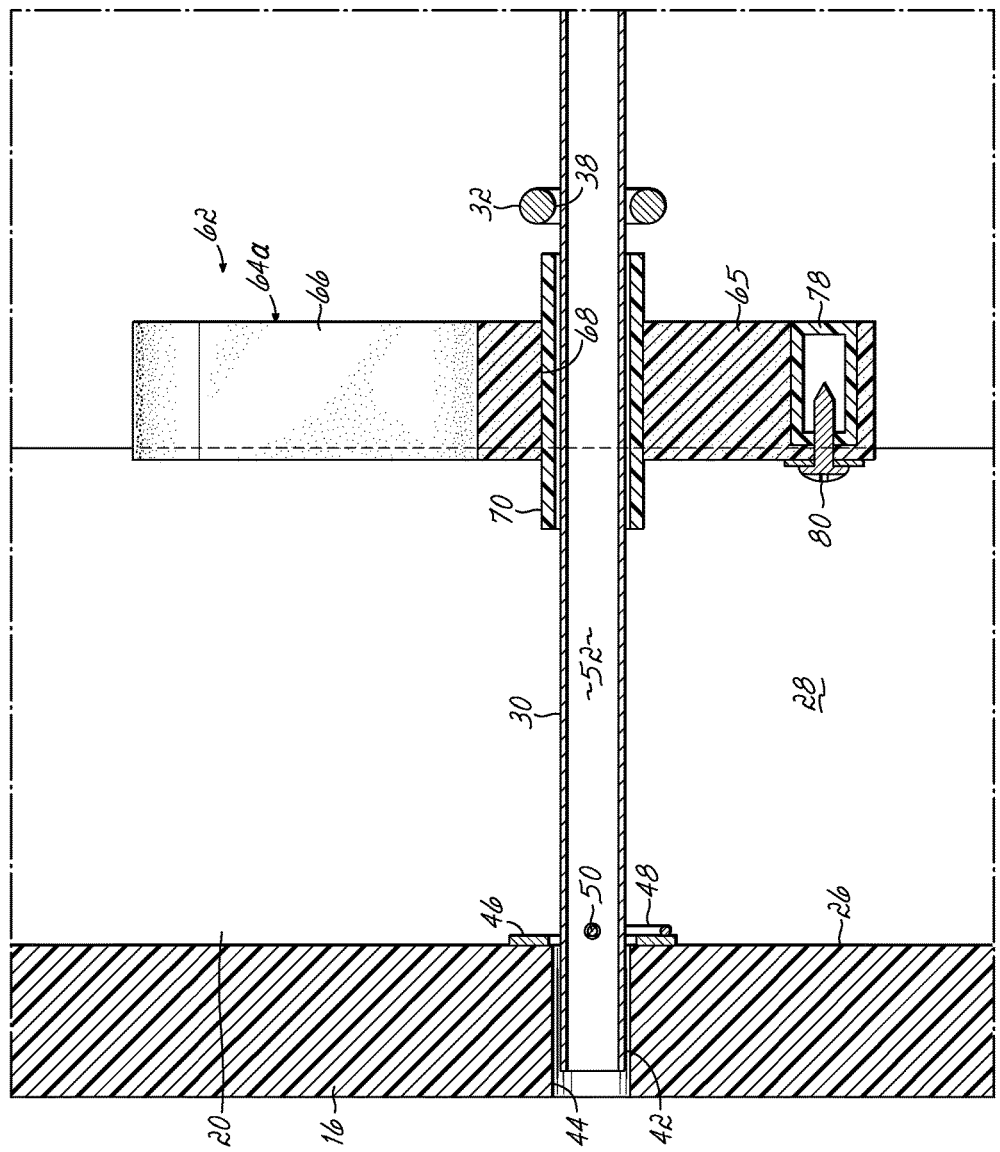
FIG. 5 is a partial cross-sectional view, like FIG. 4, showing a different upper dunnage component.

FIG. 5 illustrates an alternative upper dunnage component 64a comprising a body or main portion 65 having notches 66 identical to the main body portion 65 of upper dunnage component 64 of FIGS. 1-4. However, each upper dunnage component 64a has no generally "U-shaped" liner or stiffener at the bottom thereof. Instead upper dunnage component 64a has a stiffener 78 in the form of a block located inside the interior of the body 65 of upper dunnage component 64a and held therein by fastener 80, as shown in FIG. 5. The stiffener 78 may be made of plastic, aluminum, steel, fiber, glass or any other stiffening material. Any of the dunnage components shown or described herein may be used in upper or lower levels of any embodiment of container shown or described herein.

Figure 3A:
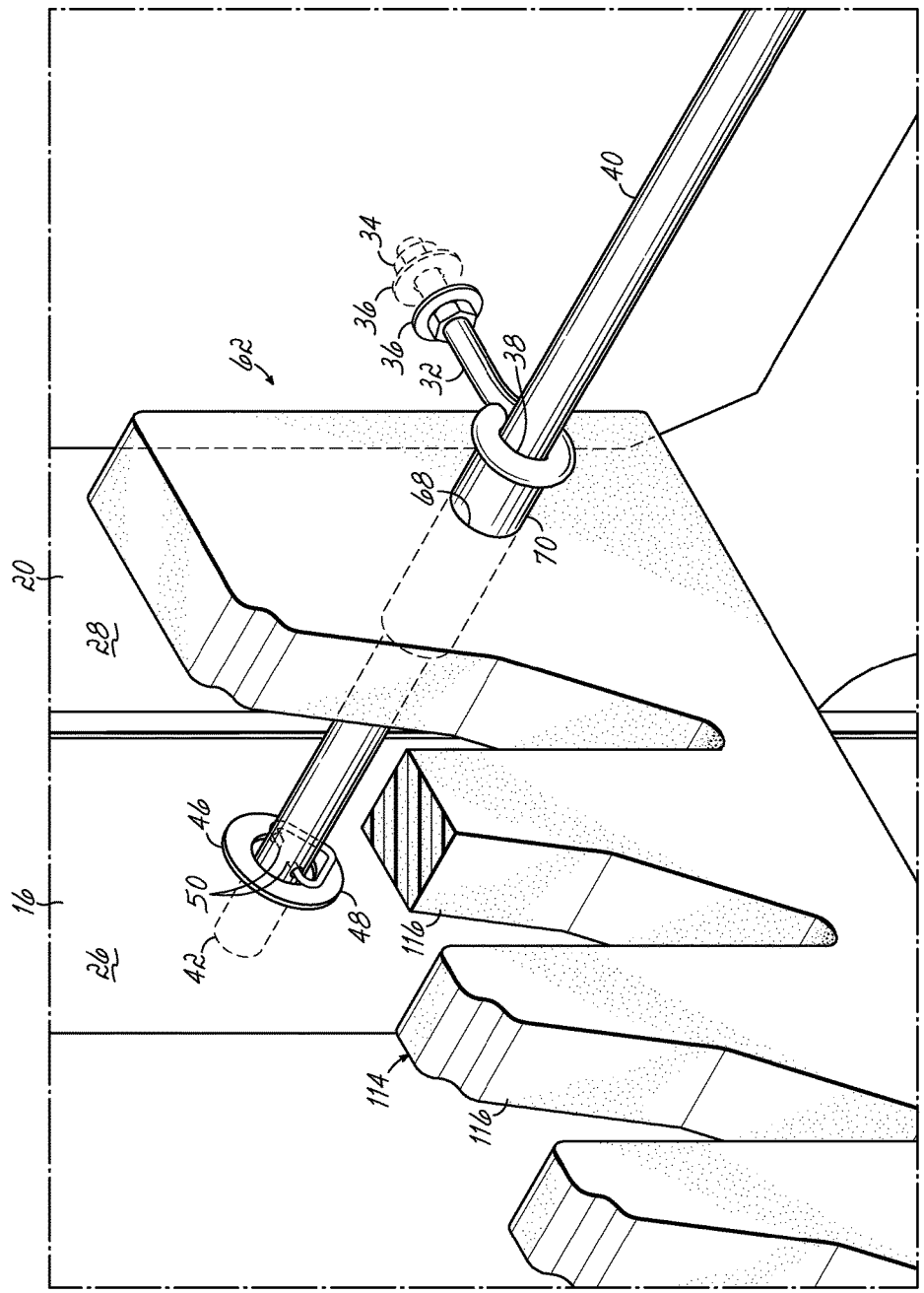
FIG. 3A is an enlarged perspective view of a portion of another embodiment of container having upper dunnage components comprising unitary pieces.

FIG. 3A illustrates an upper dunnage component 114 which may be incorporated into any container in place of one of the dunnage components 64. Each of the upper dunnage components 114 has notches 116 identical to the notches 66 of upper dunnage component 64. However, each upper dunnage component 114 has no liner or stiffener. Each dunnage component 114 is a one-piece unitary body made of foam, rubber, wood or any other suitable material. These dunnage components 114 may be used in upper or lower levels of dunnage of any of the embodiments of container shown or described herein. Although one specific shape of notch 116 is illustrated in the drawings, this document is not intended to limit in any way the size, shape or configuration of notches 116 in any of the dunnage components 114 of the upper level of dunnage 62 or any of the levels of dunnage.

Figure 3B:
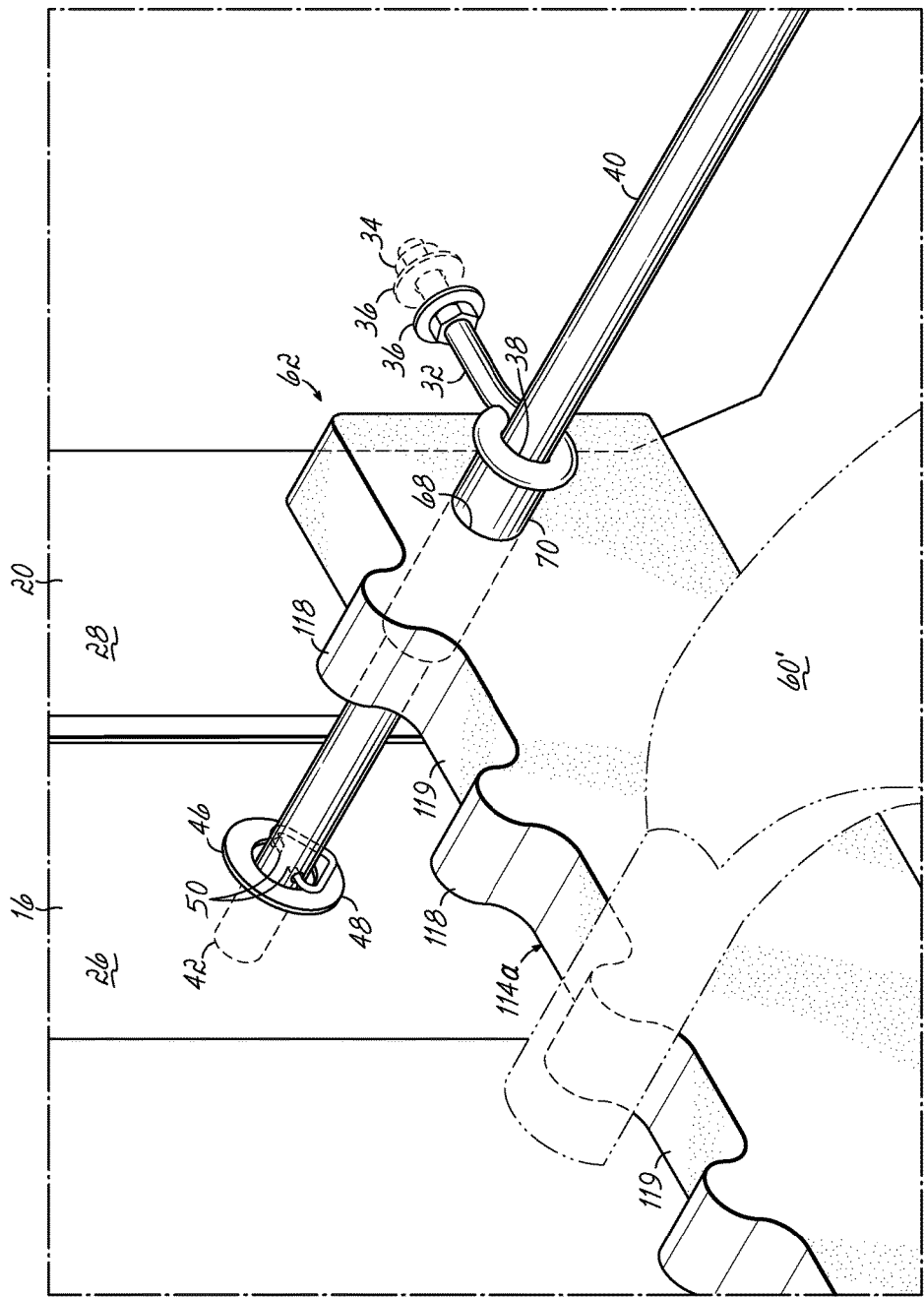
FIG. 3B is an enlarged perspective view of a portion of another embodiment of container having different upper dunnage components.

FIG. 3B illustrates an upper dunnage component 114a which may be incorporated into any container in place of one of the dunnage components 64 or dunnage components 114 shown in FIG. 3A. Each of the upper dunnage components 114a has a specific geometry for a particular part or product, in this case, a plurality of spaced protrusions 118 between recesses or valleys 119. The protrusions 118 may be configured or sized to fit into one or more recesses (not shown) of a product 60', shown in dashed lines in FIG. 3A, to reduce the likelihood of the product 60' moving, shifting or separating from the dunnage and getting damaged during shipment. In other words, the specific configuration of the dunnage components may be shaped or configured to secure products in place so as to reduce the chances of the products getting damaged during shipment. Like upper dunnage component 114 shown in FIG. 3A, each upper dunnage component 114a has no liner or stiffener. Each upper dunnage component 114a is a one-piece unitary body made of foam, rubber, wood or any other suitable material. These dunnage components 114a may be used in upper or lower levels of dunnage in any of the embodiments of container shown or described herein. Although one specific shape of protrusion 118 is illustrated in the drawings, this document is not intended to limit in any way the size, shape or configuration of protrusions 118 in any of the dunnage components 114a of the upper level of dunnage 62 or any of the levels of dunnage. If desired, the unitary dunnage component 114a shown in FIG. 3B may be incorporated into a dunnage component having one or more liners or stiffeners in accordance with the present invention.

Figure 3C:
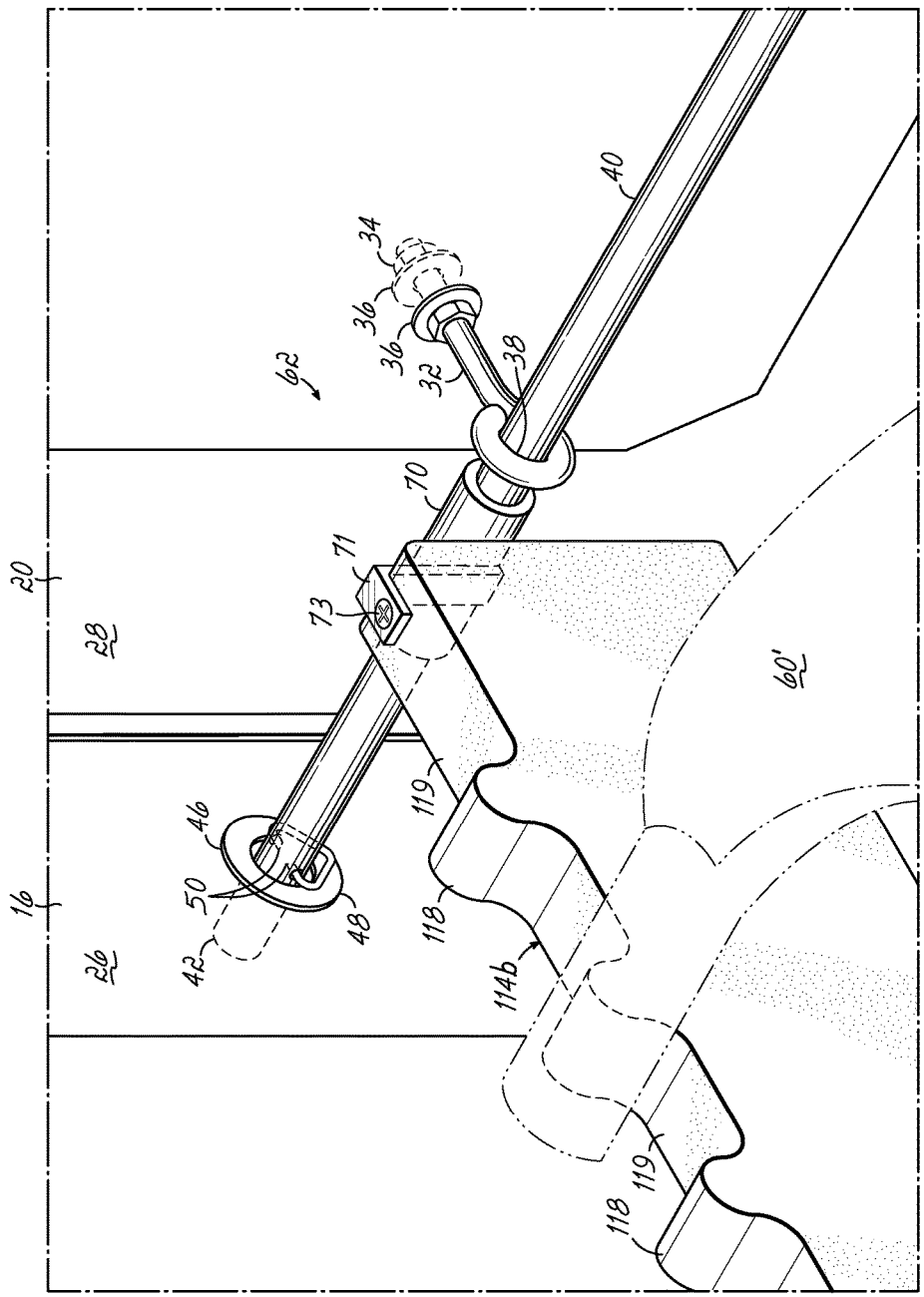
FIG. 3C is an enlarged perspective view of a portion of another embodiment of container having different upper dunnage components.

FIG. 3C illustrates a dunnage component 114b which may be incorporated into any container in place of any of the dunnage components shown or described herein. Each of the dunnage components 114b may have a specific geometry for a particular part or product; in this case, a plurality of spaced protrusions 118 between recesses or valleys 119. The protrusions 118 may be configured or sized to fit into one or more recesses (not shown) of a product 60', shown in dashed lines in FIG. 3C, to reduce the likelihood of the product 60' moving, shifting or separating from the dunnage and getting damaged during shipment. In other words, the specific configuration of the dunnage components may be shaped or configured to secure products in place so as to reduce the chances of the products getting damaged during shipment. Unlike dunnage components 64, 114, 114a shown in FIGS. 3, 3A, 3B, respectively, each dunnage component 114b has no opening therethrough. Instead, each dunnage component 114b comprises a one-piece unitary body made of foam, rubber, wood or any other suitable material to which is secured a sleeve 70 with a bracket 71 and fastener 73. Although one type of bracket 71 is shown, any known bracket may be used. Similarly, although one particular sleeve 70 is illustrated, other types of sleeves may be used. Sleeve 70 is sized to allow one of the guides 40 to extend through the sleeve 70 regardless of whether the sleeve 70 is inside or outside the body of the dunnage component. These dunnage components 114b may be used in upper or lower levels of dunnage in any of the embodiments of container shown or described herein. Although one specific shape of protrusion 118 is illustrated in the drawings, this document is not intended to limit in any way the size, shape or configuration of protrusions 118 in any of the dunnage components 114b. If desired, a sleeve and bracket-like sleeve 70 and bracket 71 may be incorporated into any of the dunnage components described or shown herein. For example, a dunnage component, like dunnage component 114 shown in FIG. 3A, may lack an opening therein, the sleeve 70 being secured to the body of the dunnage component 114 with a bracket or via any other suitable manner.

Figure 3D:
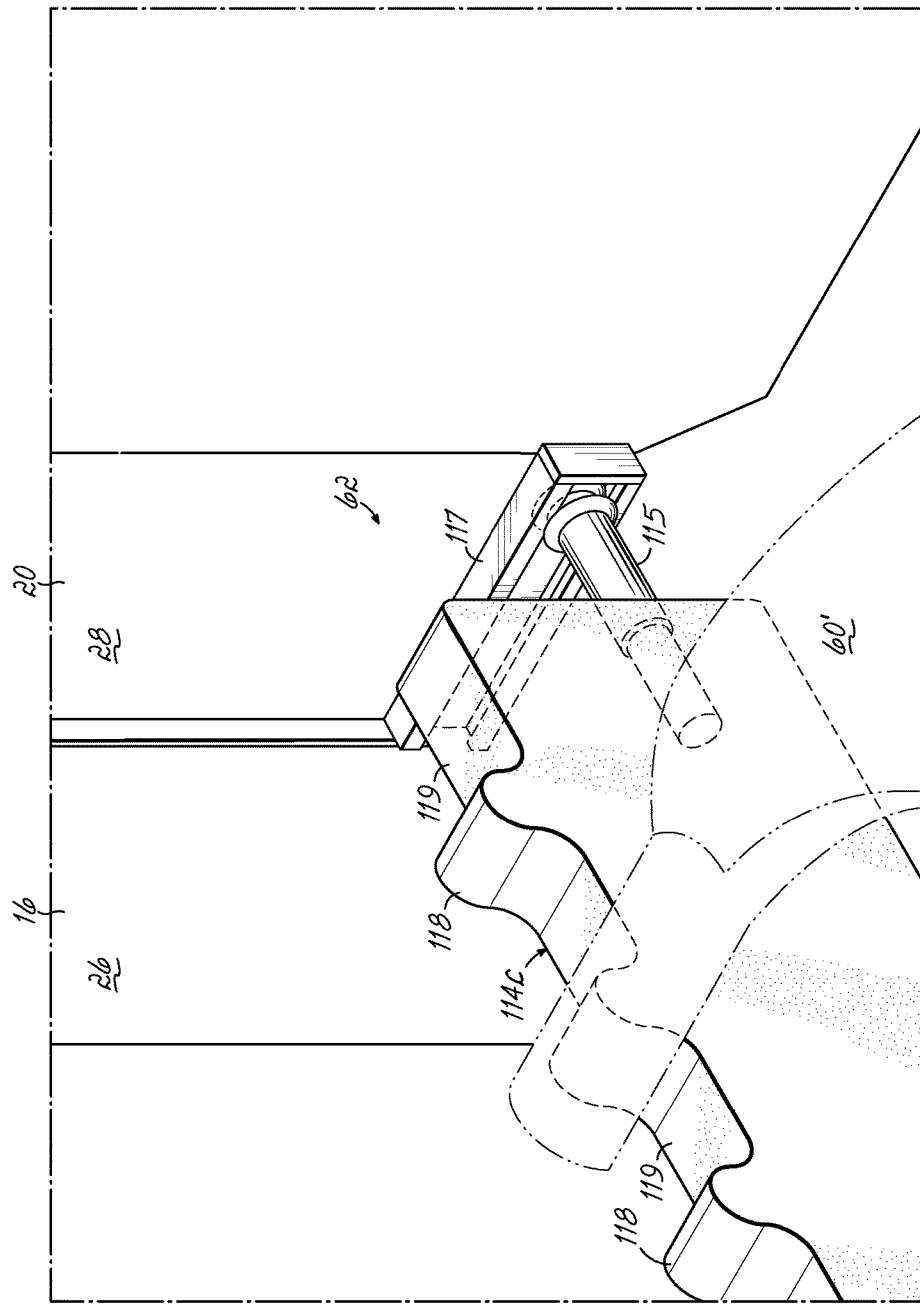
FIG. 3D is an enlarged perspective view of a portion of another embodiment of container having different upper dunnage components and different guides.

FIG. 3D illustrates another dunnage component 114c which may be incorporated into any container in place of one of the dunnage components shown or described herein. Each upper dunnage component 114c has no opening therethrough. Instead, each upper dunnage component 114c comprises a one-piece unitary body made of foam, rubber, wood or any other suitable material to which is secured a slider 115 like those described and shown in U.S. Pat. No. 7,762,422, which is fully incorporated herein. Although one type of slider 115 is shown, any other shaped slider may be used. Slider 115 is sized to move along a track 117 like tracks shown in U.S. Pat. No. 7,762,422. These dunnage components 114c and tracks 117 may be used in upper or lower levels of dunnage in any of the embodiments of container shown or described herein. Although one specific shape of track 117 is illustrated in the drawings, this document is not intended to limit in any way the size, shape or configuration of tracks 117 in any of the levels of dunnage. If desired, the tracks 117 may be the full width of the interior of the container.

Figure 6B:
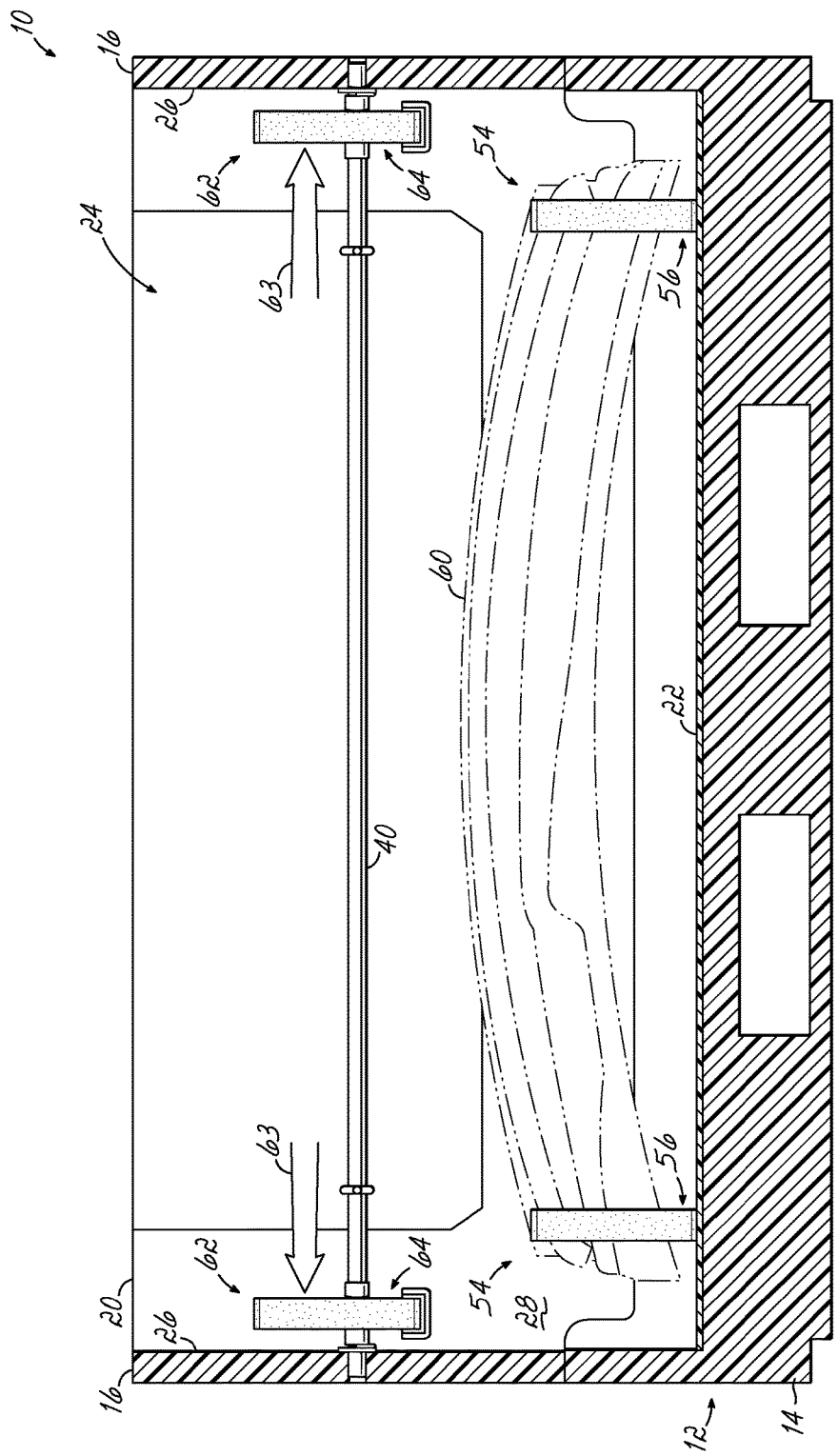
FIG. 6B is a cross-sectional view of the container shown in FIG. 6A, the dunnage components of the upper level being shown in an open position and products of the lower level being shown in dashed lines.
Figure 6C:
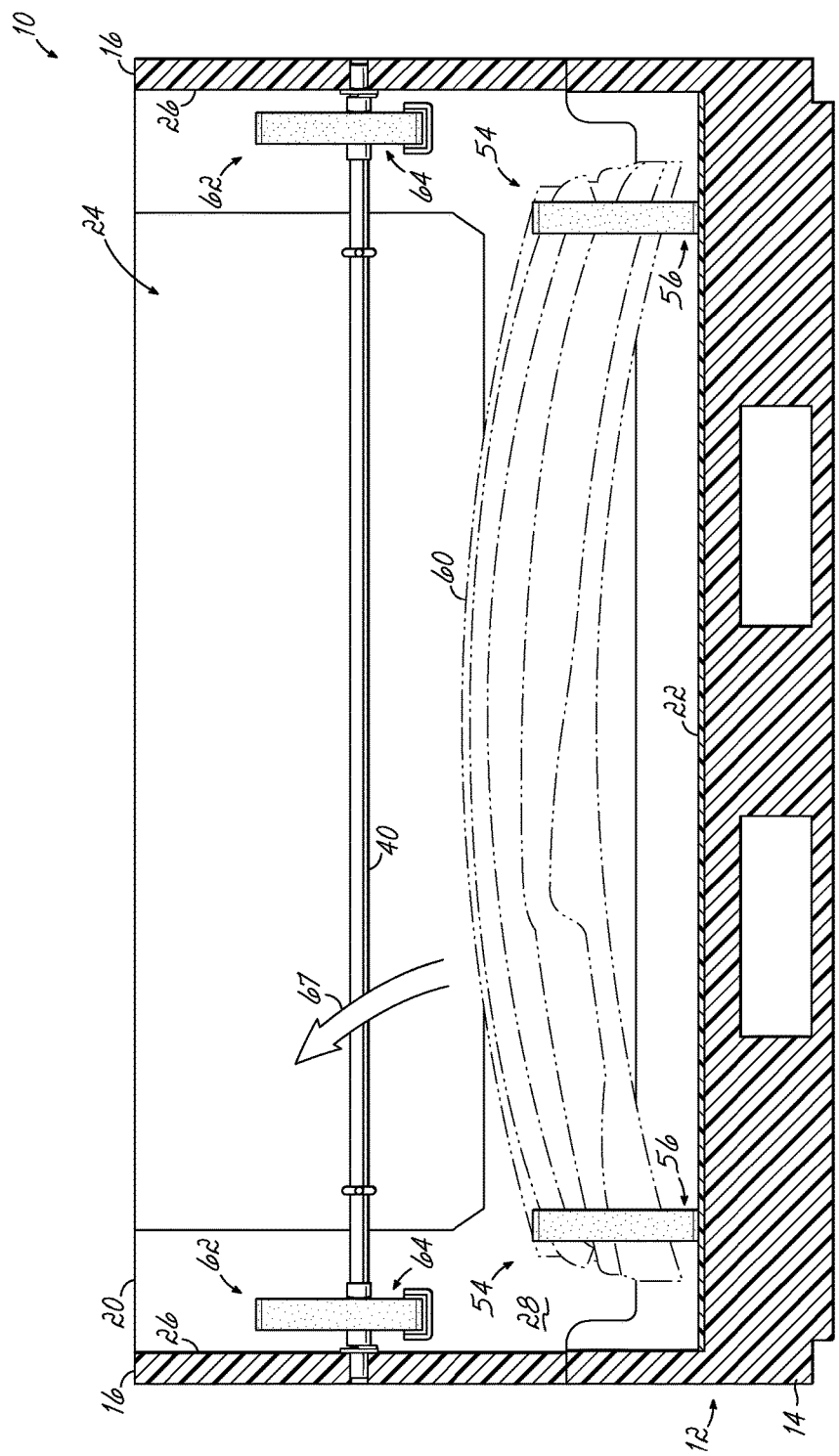
FIG. 6C is a cross-sectional view of the container shown in FIG. 6B, the dunnage components of the upper level being shown in an open position and products of the lower level being removed from inside the container.

FIGS. 6A-6C illustrates a method of unloading product 60 from a fully loaded container 10. The method comprises the first step of pulling product 60 extending between the two dunnage components 64 of the upper level or layer of dunnage 62 out of the dunnage in the direction of arrow 61. As shown in FIG. 6B, the two dunnage components 64 of the upper level or layer of dunnage 62 are then moved outwardly away from each other in the direction of arrows 63. More specifically, an operator moves them from a first or closed position shown in FIG. 6A to a second or open position illustrated in FIG. 6B. As shown in FIG. 6B, when the two dunnage components 64 of the upper level of dunnage 62 are in their second or open position, the opening therebetween is greater than when they are in the first or closed position illustrated in FIG. 6A. As shown in FIG. 6C, the next step comprises removing product 60 extending between the dunnage components 56 of the lower level of dunnage 54, the two dunnage components 64 of the upper level of dunnage 62 remaining in their second or open position. With the dunnage components 64 of the upper level of dunnage 62 being in their second or open position, products 60 in the lowermost level of dunnage 54 may be more easily removed from the container in the direction of arrow 67 without the dunnage components 64 of the upper level of dunnage 62 being in the way or obstructing the removal of the lower level of products though the opening.

Figure 6D:
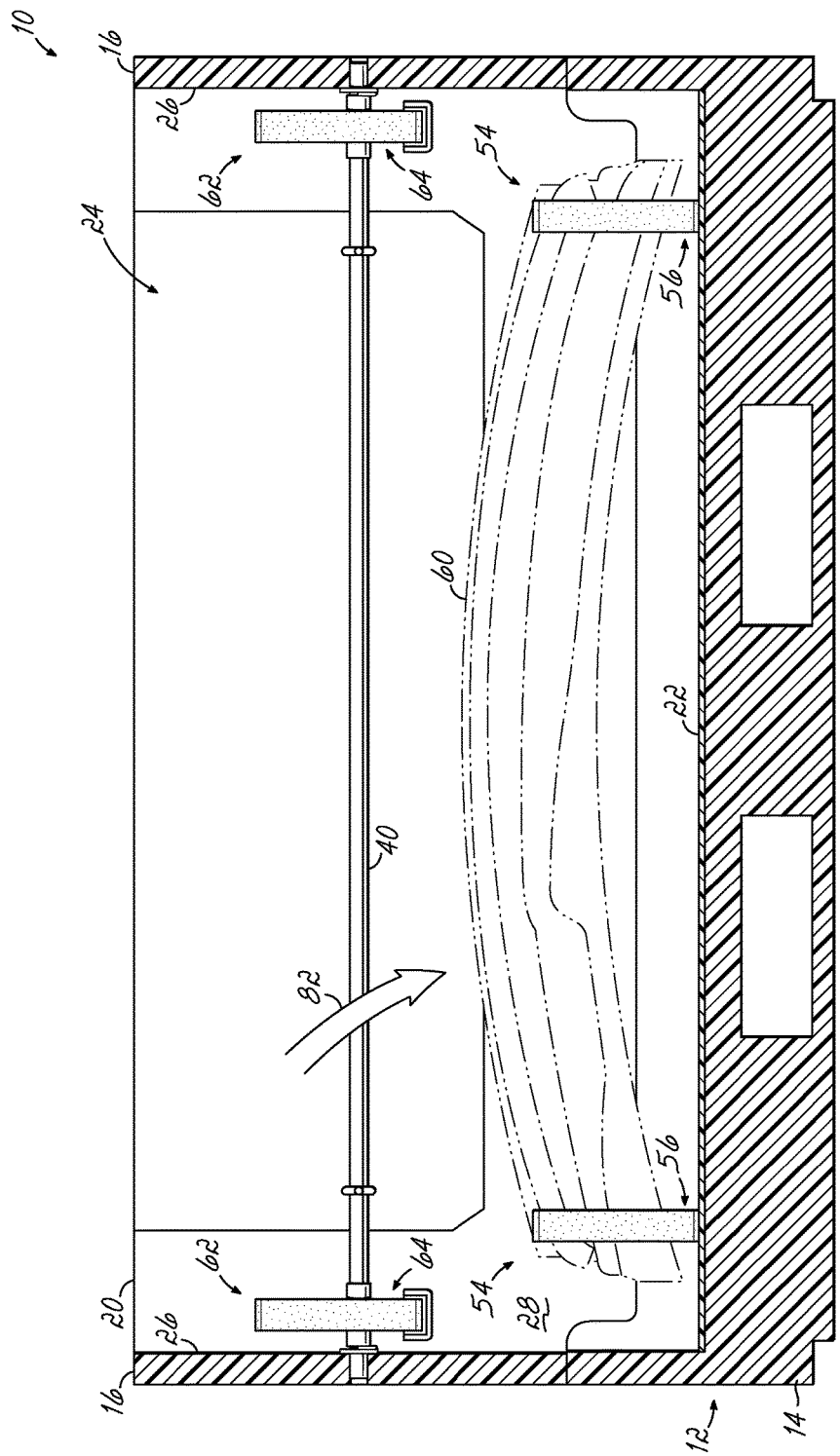
FIG. 6D is a cross-sectional view of the container shown in FIG. 1, products being loaded into the dunnage components of the lower level.
Figure 6E:
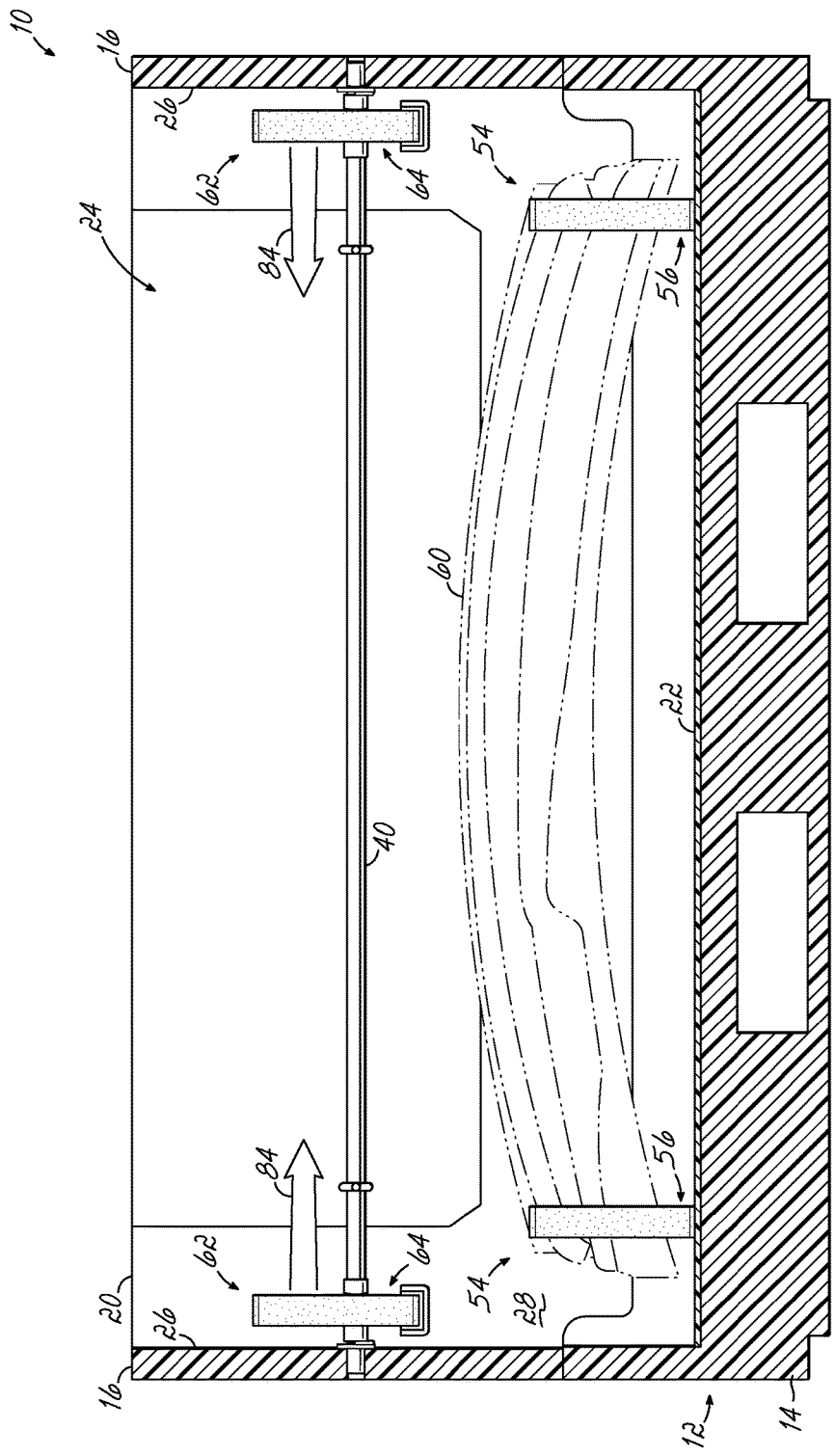
FIG. 6E is a cross-sectional view of the container shown in FIG. 6D, the dunnage components of the upper level shown being moved to a closed position after the lower level of dunnage is fully loaded with products.

FIGS. 6D-6F illustrates a method of loading product 60 into an empty container 10. As shown in FIG. 6D, products 60 are loaded into the container's interior 24 by the operator in the direction shown by arrow 82 between the dunnage components 64 of the upper level of dunnage 62 (which are in their open position). Thus, products 60 are loaded into the lower level of dunnage 54 and, more specifically, loaded such that each product 60 extends between the dunnage components 56 of the lower level of dunnage 54. As shown in FIG. 6E, once the lower level of dunnage 54 is full of product 60, the two dunnage components 64 of the upper level or layer of dunnage 62 are then moved inwardly towards each other in the direction of arrows 84. More specifically, an operator moves them from a second or open position shown in FIG. 6D to a first or closed position illustrated in FIG. 6F. The distance they travel inwardly is limited by the location of the supports 32. Each of the dunnage components 64 of the upper level of dunnage 62 does not travel between the supports 32. In other words, each of the dunnage components 64 of the upper level of dunnage 62 does not travel inside the support 32 closest to it. As shown in FIG. 6F, the last step of the method comprises loading product 60 into the upper level or layer of dunnage 62 in the direction of arrow 86, each product 60 extending between the two dunnage components 64 of the upper level or layer of dunnage 62.

Although FIGS. 6A-6F illustrate methods of loading and unloading product into container 10 having two guides 40, these methods may be used in any of the embodiments shown or described herein. For example, the upper components may be moved in the same manner using the container 10a having the shorter guides 40a. Although one configuration of container is shown and described with respect to the method, the method may be practiced with any container shown or described herein.

Figure 7:
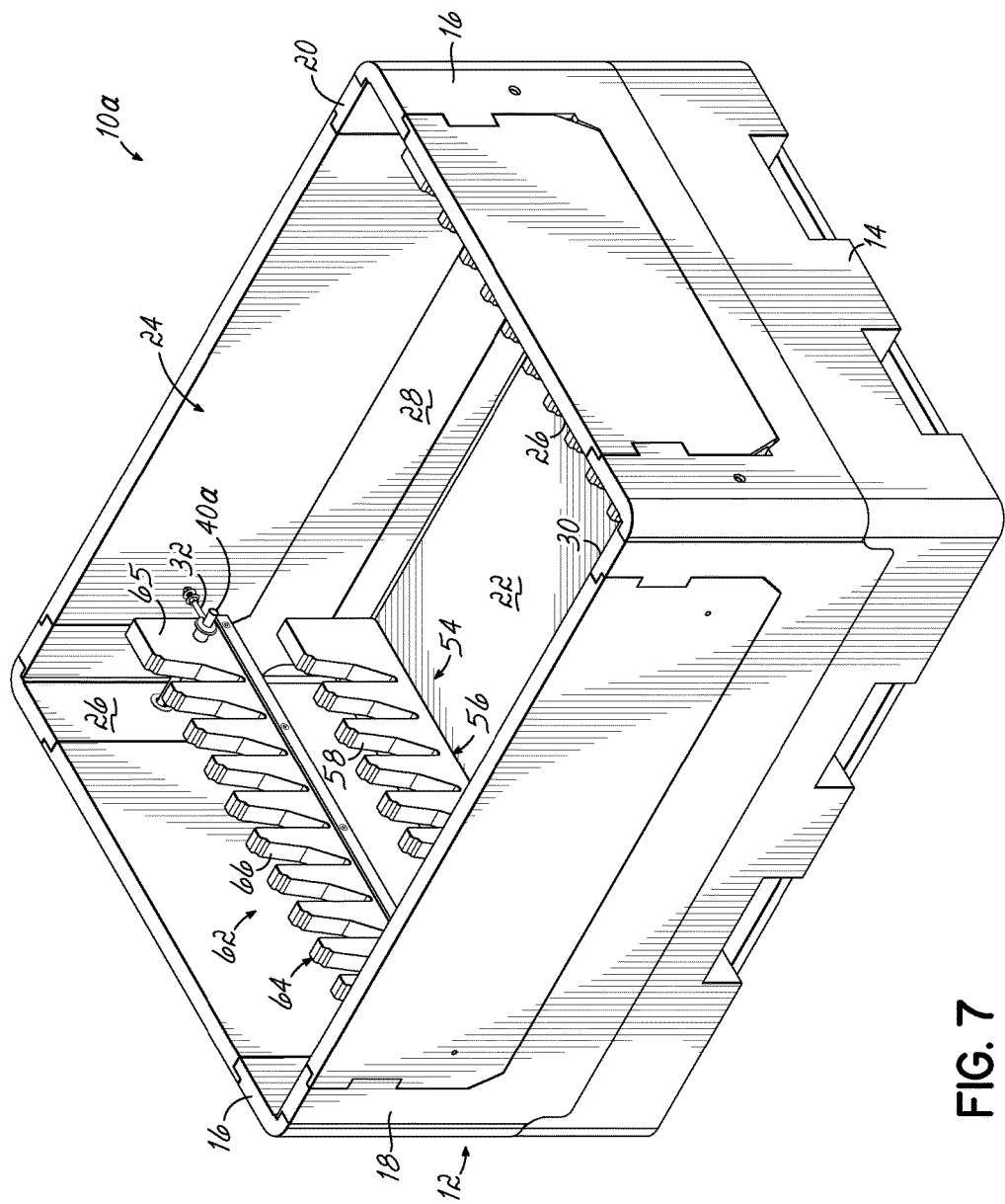
FIG. 7 is a perspective view of another embodiment of a reusable and returnable container.
Figure 8:
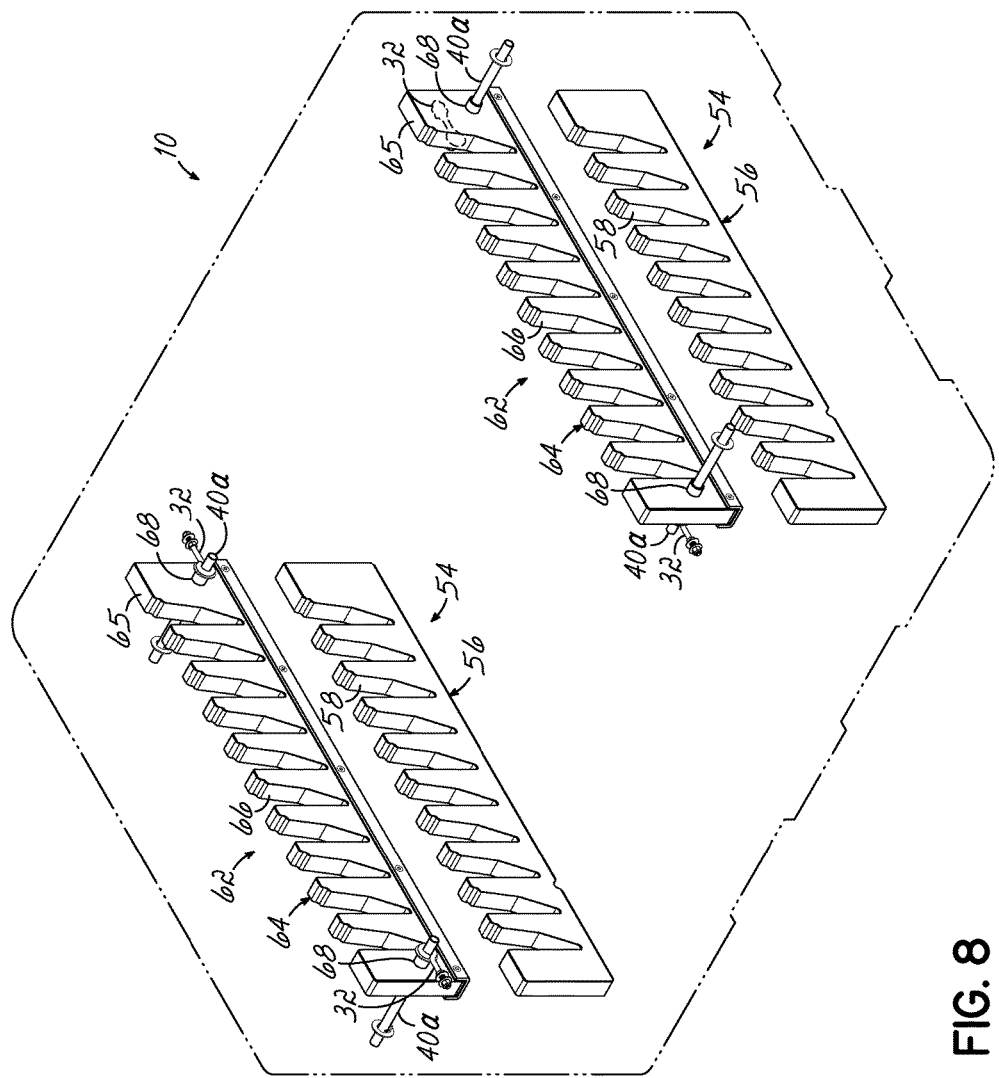
FIG. 8 is a perspective view of the container of FIG. 7 showing the dunnage inside the container.
Figure 9:
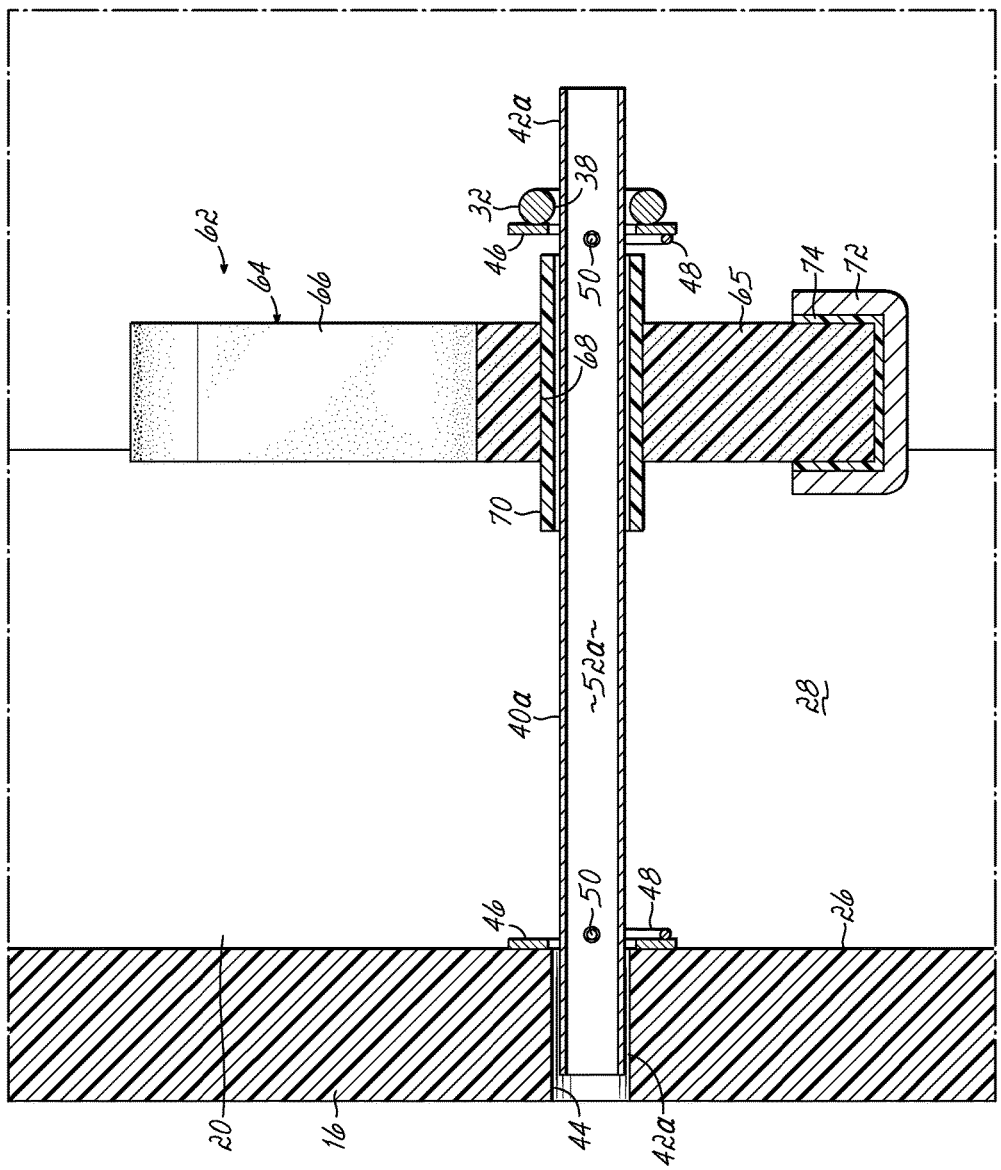
FIG. 9 is a partial cross-sectional view of a portion of the container shown in FIGS. 7 and 8.
Figure 10:
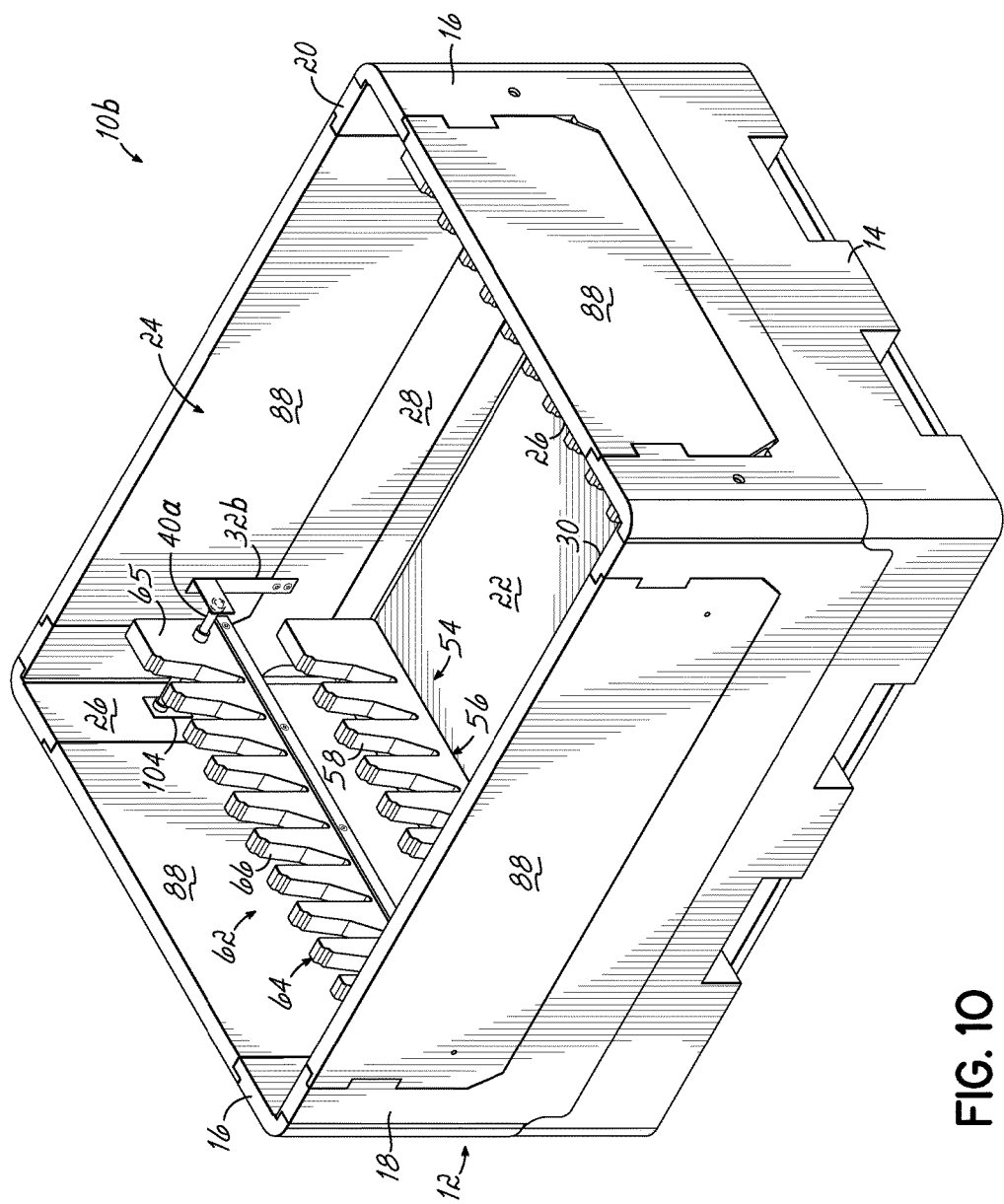
FIG. 10 is a perspective view of another embodiment of a reusable and returnable container.

FIGS. 7, 8 and 9 illustrate an alternative embodiment of container 10a. Container 10a is identical to container 10 except for the guides. Rather than having two guides 40, each having a length greater than the width "W" of the interior 24 of the container 10, container 10a has four guides 40a. Two of the four guides 40a are front guides, and two are rear guides, each guide 40a being shorter in length than the width "W" of the interior 24 of the container 10a. In this embodiment, one of the rear guides 40a extends between one of the side walls 20 and a support 32 operatively coupled to rear wall 20. The other rear guide 40a extends between the other side wall 20 and the other support 32 operatively coupled to rear wall 20. Similarly, as shown in FIG. 8, each of the front guides 40a extends from one of the container side walls 16 to the nearest support 32. As shown in FIG. 9, each guide 40a extends through an opening 38 through one of the supports or eye bolts 32 operatively coupled to the front or rear wall 18, 20 of the container 10. As shown in FIG. 9, each guide 40a has opposed end portions 42a. As shown in FIG. 9, one end portion 42a of each guide 40a extends into a bore 44 in one of the container side walls 16. As shown in FIGS. 8 and 9, a washer 46 is located inside the container side wall 16 surrounding the guide 40a. A holder 48, like the holder 48 shown in FIG. 3, is secured to the guide 40a inside the washer 46. As best shown in FIG. 9, two holders 48 are secured to each guide 40a. Each holder 48 is in the form of a triangular metal wire and has two ends 50 which fit into holes in the guide 40a. The holders 48 function to hold each guide 40a in place. The pair of holders 48, acting in concert, functions to prevent the guide 40 from separating from one of the container side walls 16 and from separating from one of the supports 32. As shown in FIG. 9, the holder 48 (shown on the left of the container) functions to prevent the guide 40a from moving further to the left, such that the right side of the guide 40a separates from the nearest support 32. The other guide 48 located inside the support 32 (shown on the right in FIG. 9) functions to prevent the guide 40a from moving to the right, such that the left side of the guide 40a separates from the side wall 16.

As shown in FIG. 9, each of the guides 40a is in the form of a tube having a hollow interior 52a. Although one configuration of guide in the form of a tube is shown and described, other types of guides, such as solid rods or beams made of metal or plastic or wood, or any other desired material, may be used if desired.

Figure 11:
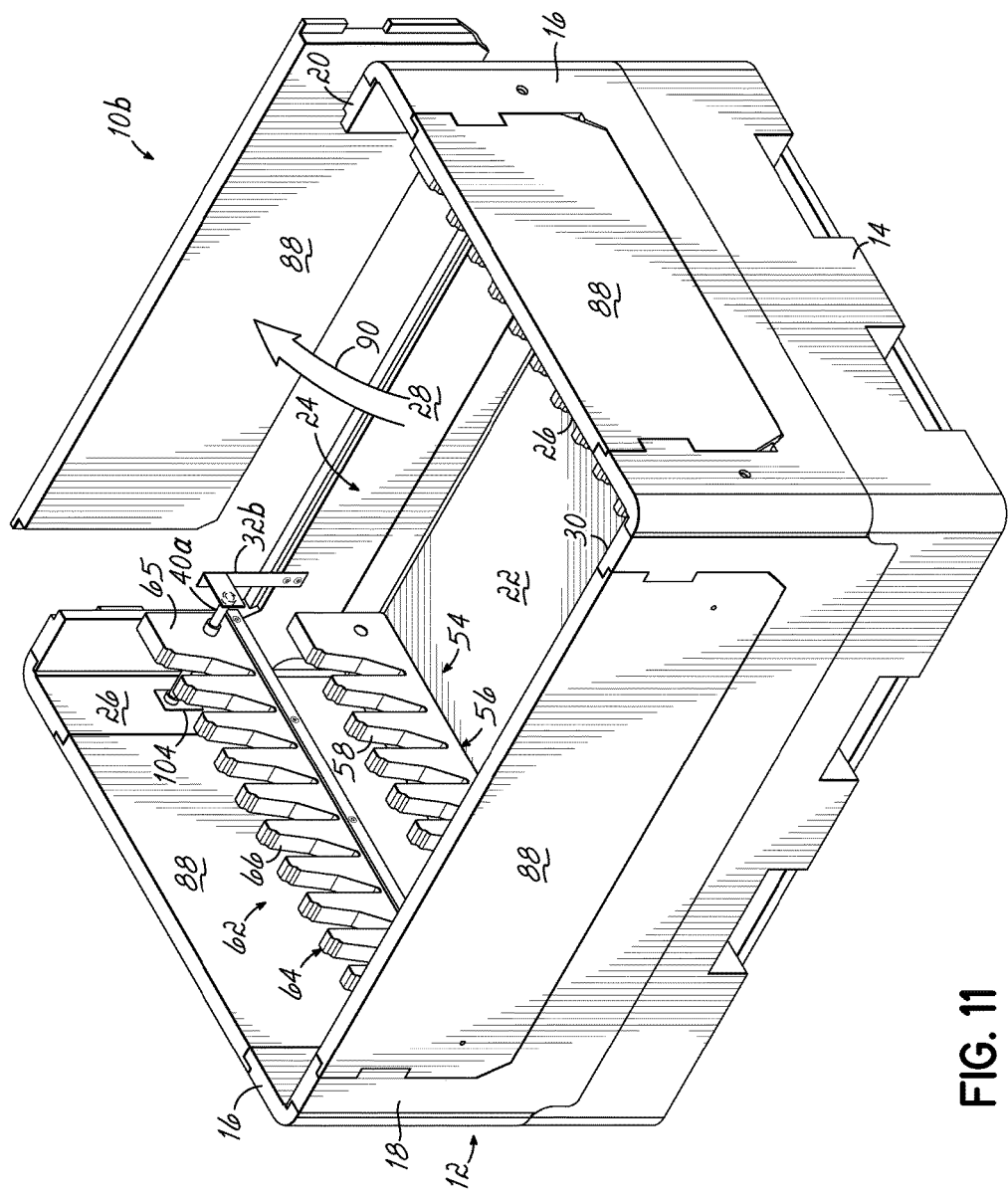
FIG. 11 is a perspective view of the container of FIG. 10 showing a door or portion of the container being removed.

FIGS. 10, 11, 12 and 13 illustrate an alternative embodiment of container 10b. Container 10b is similar to container 10a and uses the same dunnage and same four guides 40a. In this embodiment, two of the four supports 32b are operatively coupled to rear wall 20 below a removable section 88. Although not shown, the other two of the four supports 32b are operatively coupled to front wall 18 below a removable section 88. As shown in FIG. 11, each of the container walls may have a removable section or door 88. FIG. 11 illustrates the removable section 88 of rear wall 20 being removed in the direction of arrow 90. Alternatively, one or more of the wall sections 88 may be hinged to the remainder of the container wall, side or side structure.

Figure 12:
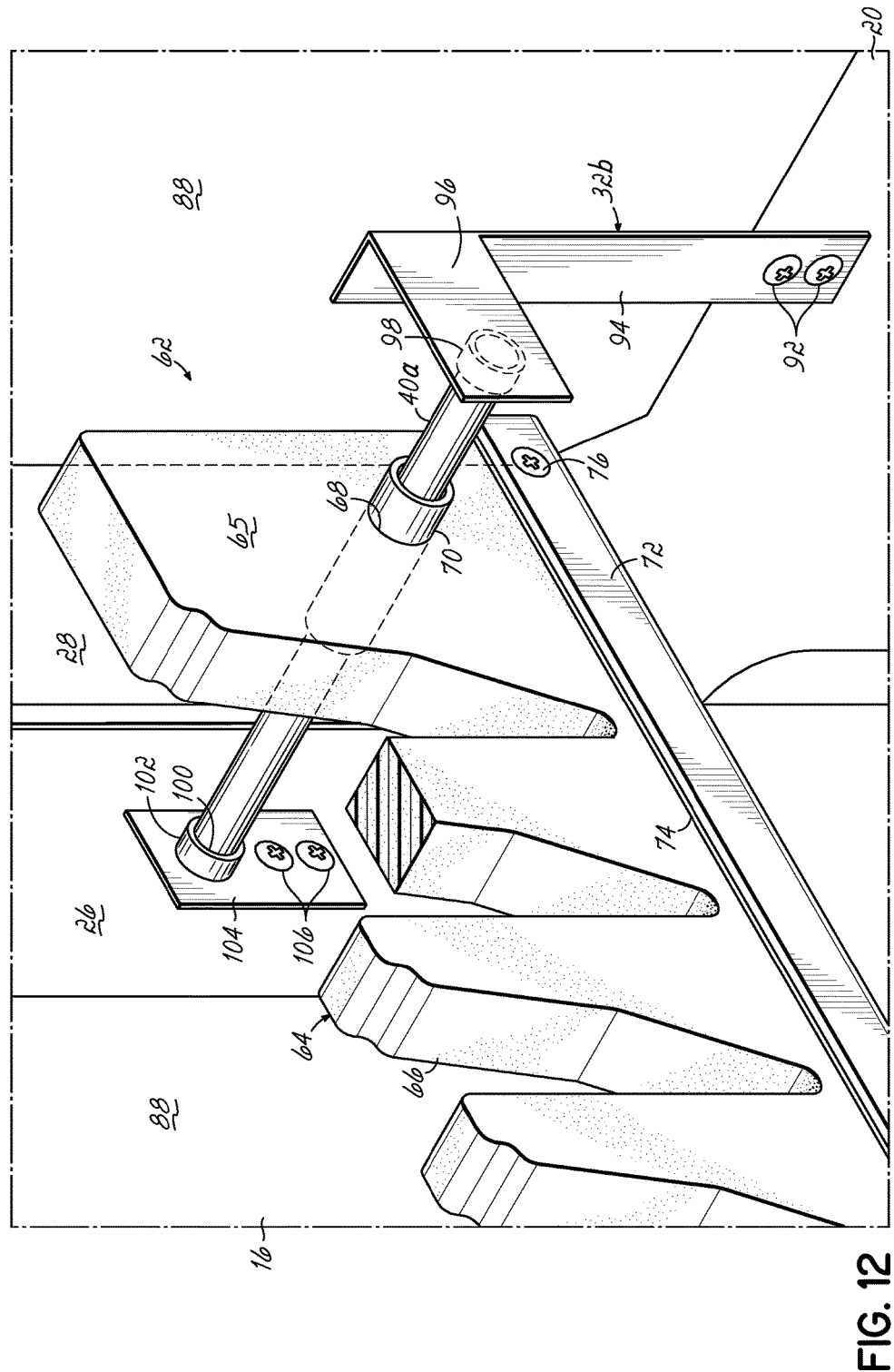
FIG. 12 is an enlarged perspective view of a portion of the container shown in FIG. 10.
Figure 13:
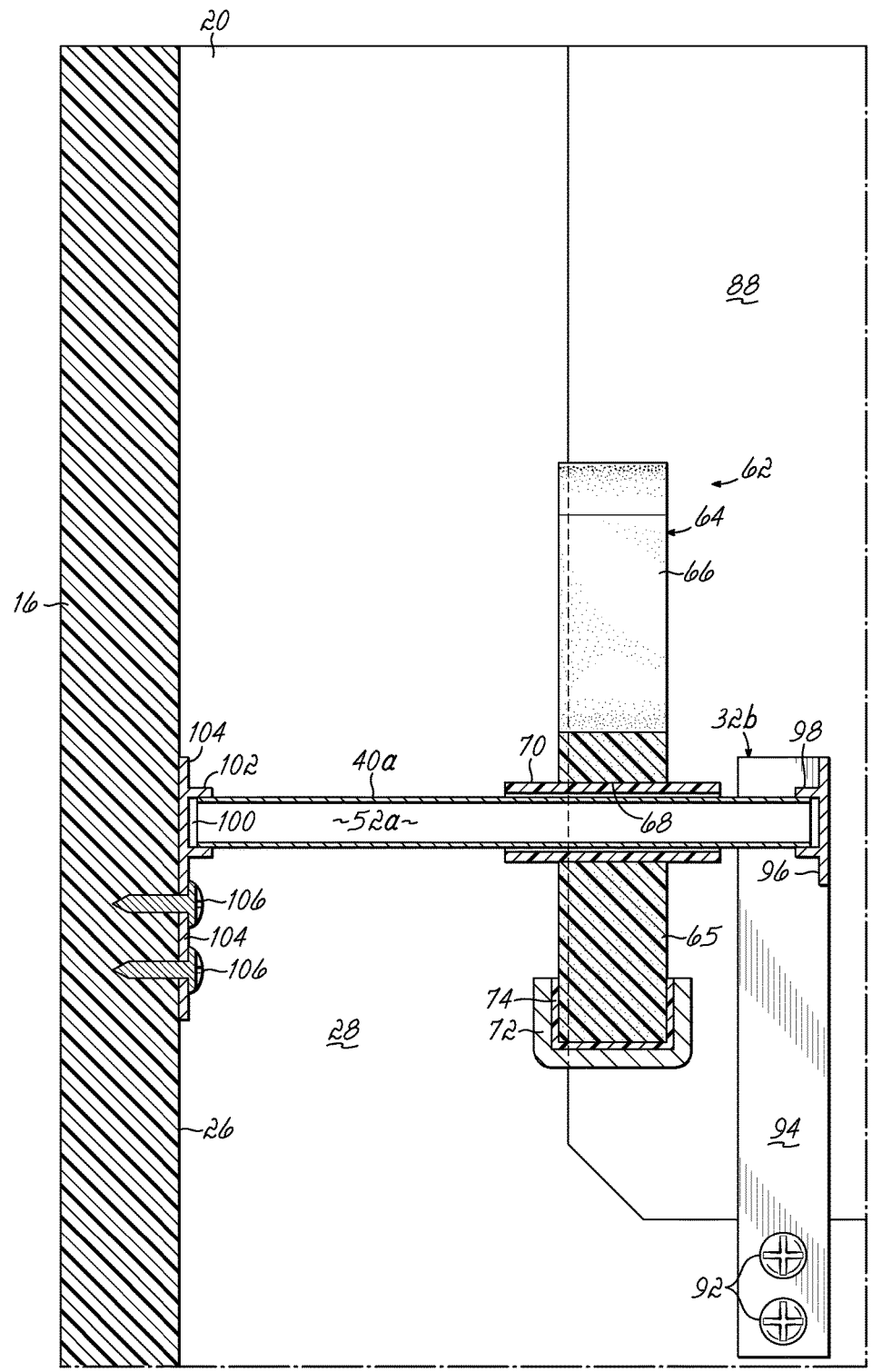
FIG. 13 is a partial cross-sectional view of a portion of the container shown in FIGS. 10 and 12.
Figure 14:
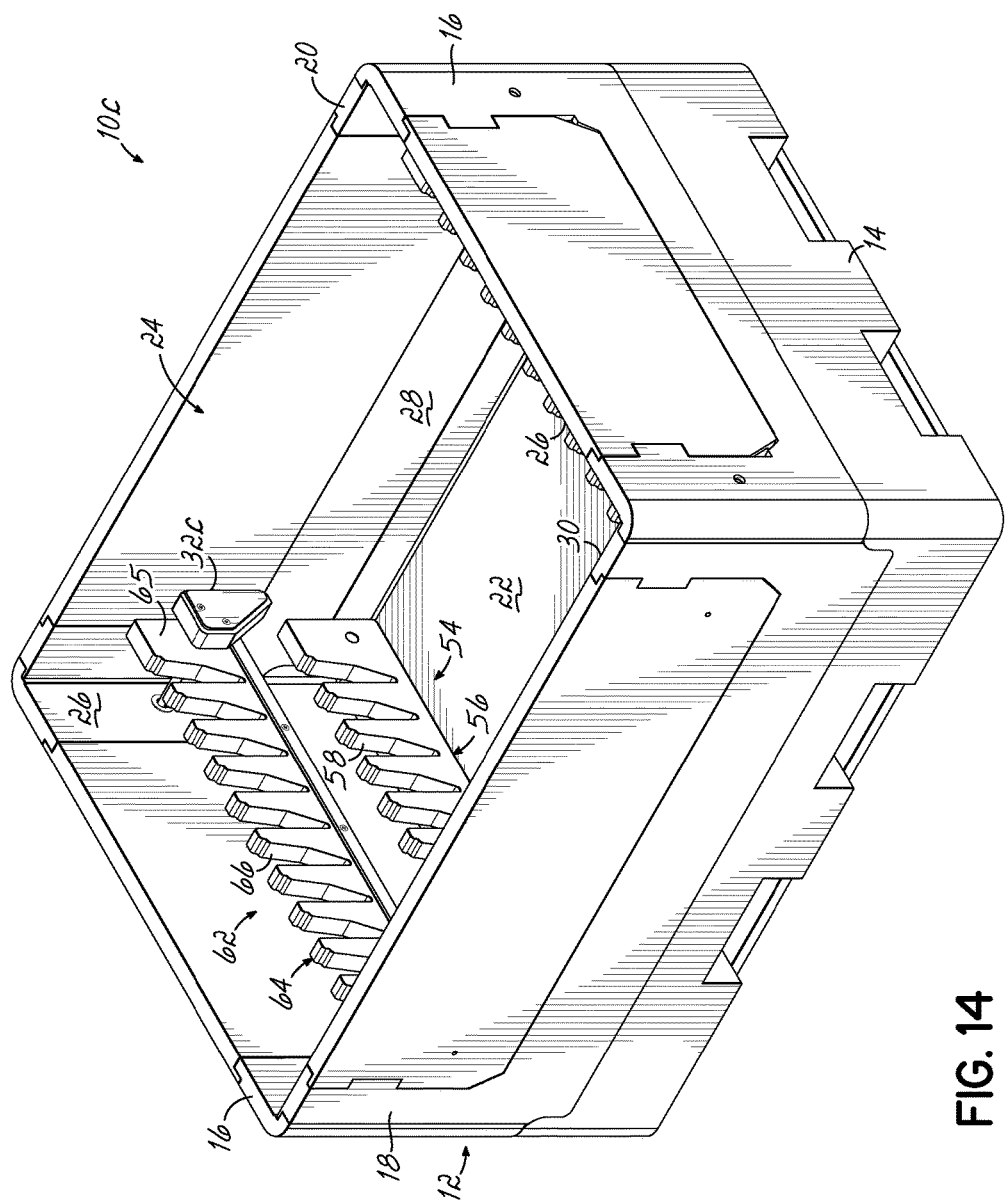
FIG. 14 is a perspective view of another embodiment of a reusable and returnable container.

As shown in FIG. 12, two of the four supports or brackets 32b are each operatively coupled with fasteners 92 to container rear wall 20 below the removable section 88 so as to not interfere with the removal of the wall section 88 of rear wall 20. The other two supports 32b are operatively coupled to the front container wall 18 below the removable section 88 so as to not interfere with the removal of the wall section 88 of front wall 18. As shown in FIG. 12, each of the supports 32*b* has a generally planar first portion 94 and a generally planar second portion 96 extending outwardly from the first portion 94. As shown in FIGS. 12 and 13, the second portion 96 of each support or bracket 32*b* has a holder 98 on an outer surface thereof. Each holder 98 is sized to receive and retain one end of one of the guides 40*a*, as best illustrated in FIG. 12. As shown in FIGS. 12 and 13, the other end of each guide 40*a* extends into an opening 100 in a flange 102 located in a bracket 104 secured to one of the container side walls 16. As shown in FIGS. 12 and 13, fasteners 106 are used to secure the bracket 104 to one of the container side walls 16.

Figure 15:
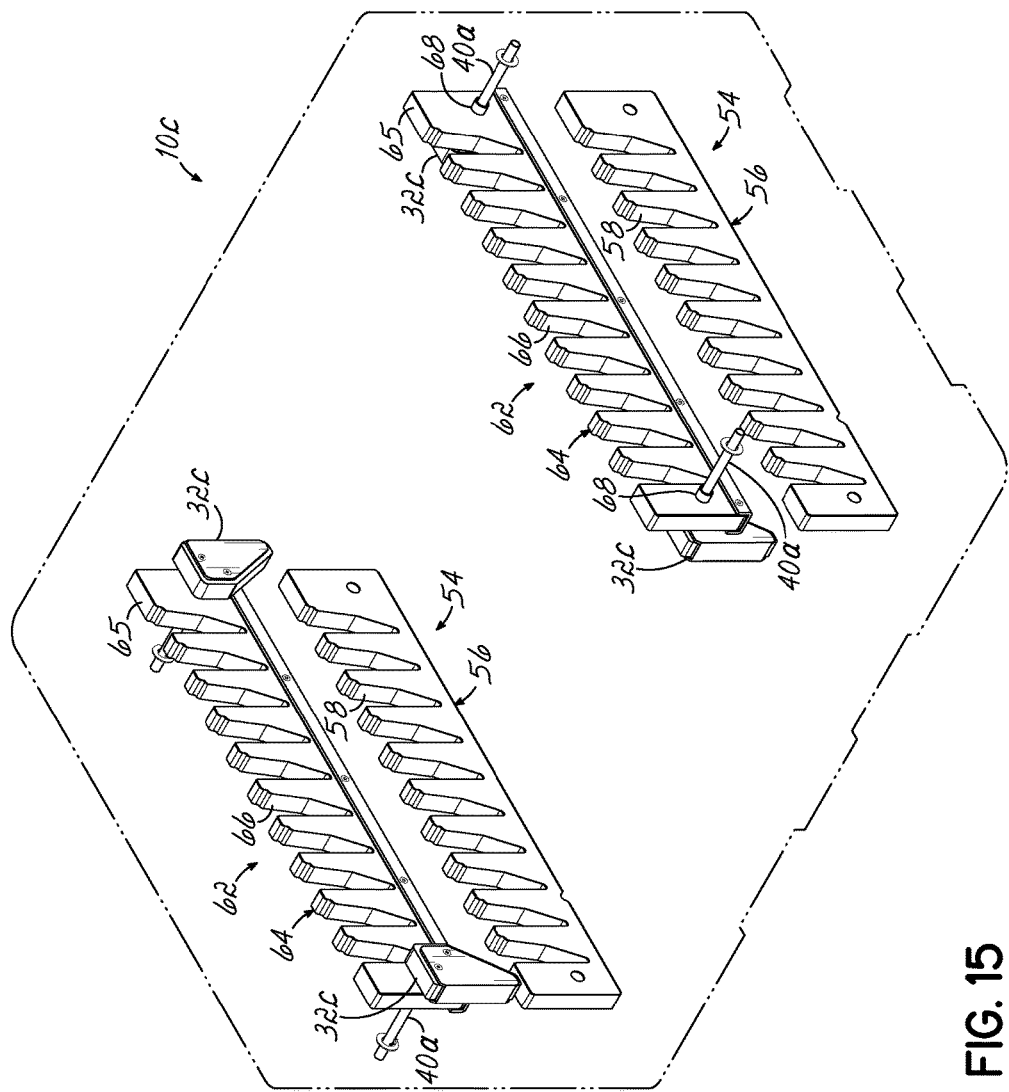
FIG. 15 is a perspective view of the container of FIG. 14 showing the dunnage inside the container.

FIGS. 14-17 illustrate an alternative embodiment of container 10*c*. Container 10*c* is similar to container 10*a* and uses the same dunnage and same four guides 40*a*. However, in container 10*c*, the supports 32*c* are not eye bolts. As best shown in FIG. 15, two of the four supports 32*c* are secured to rear wall 20, and the other two of the four supports 32*c* are secured to front wall 18 in any conventional manner.

Figure 16:
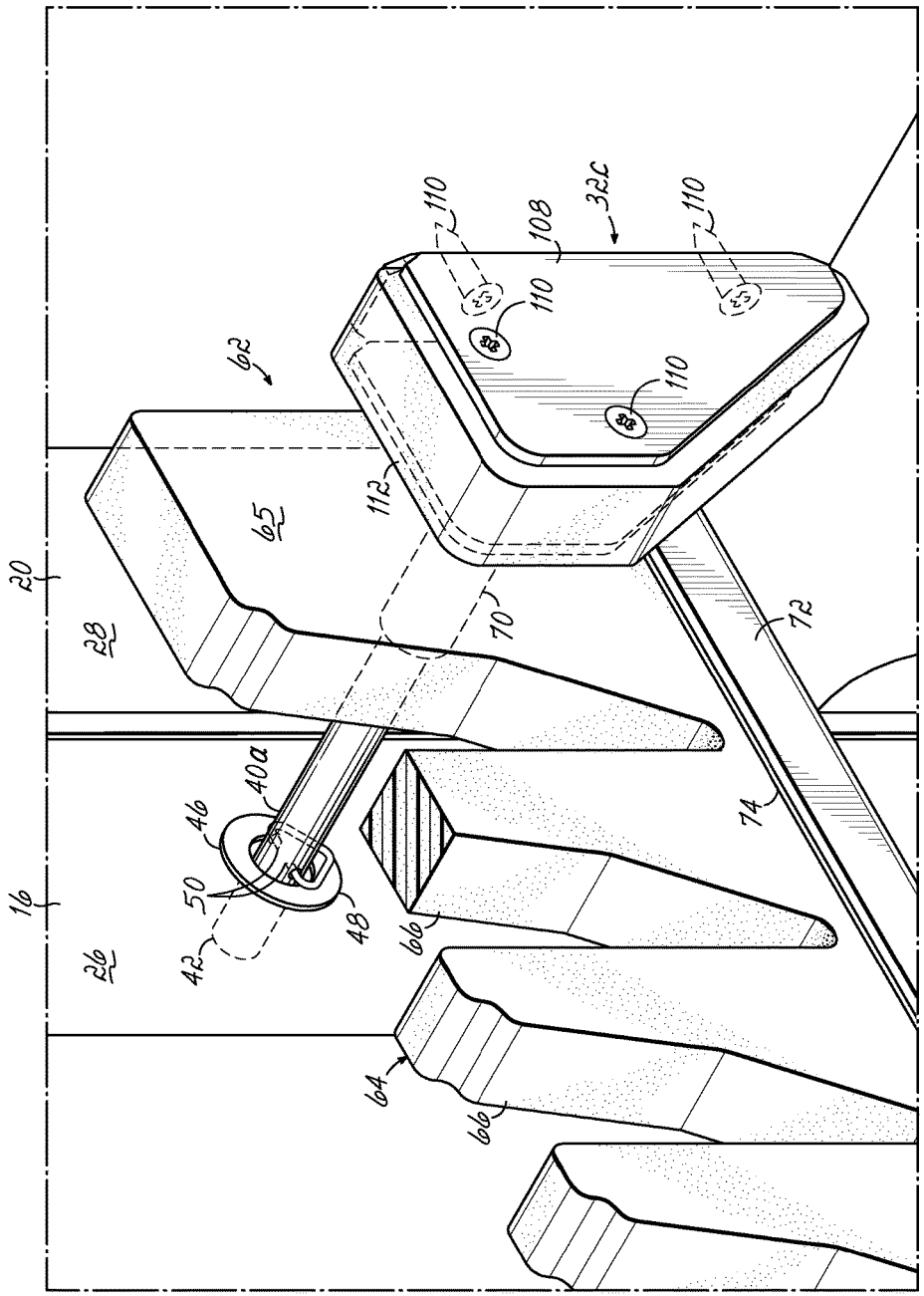
FIG. 16 is an enlarged perspective view of a portion of the container shown in FIGS. 14 and 15.
Figure 17:
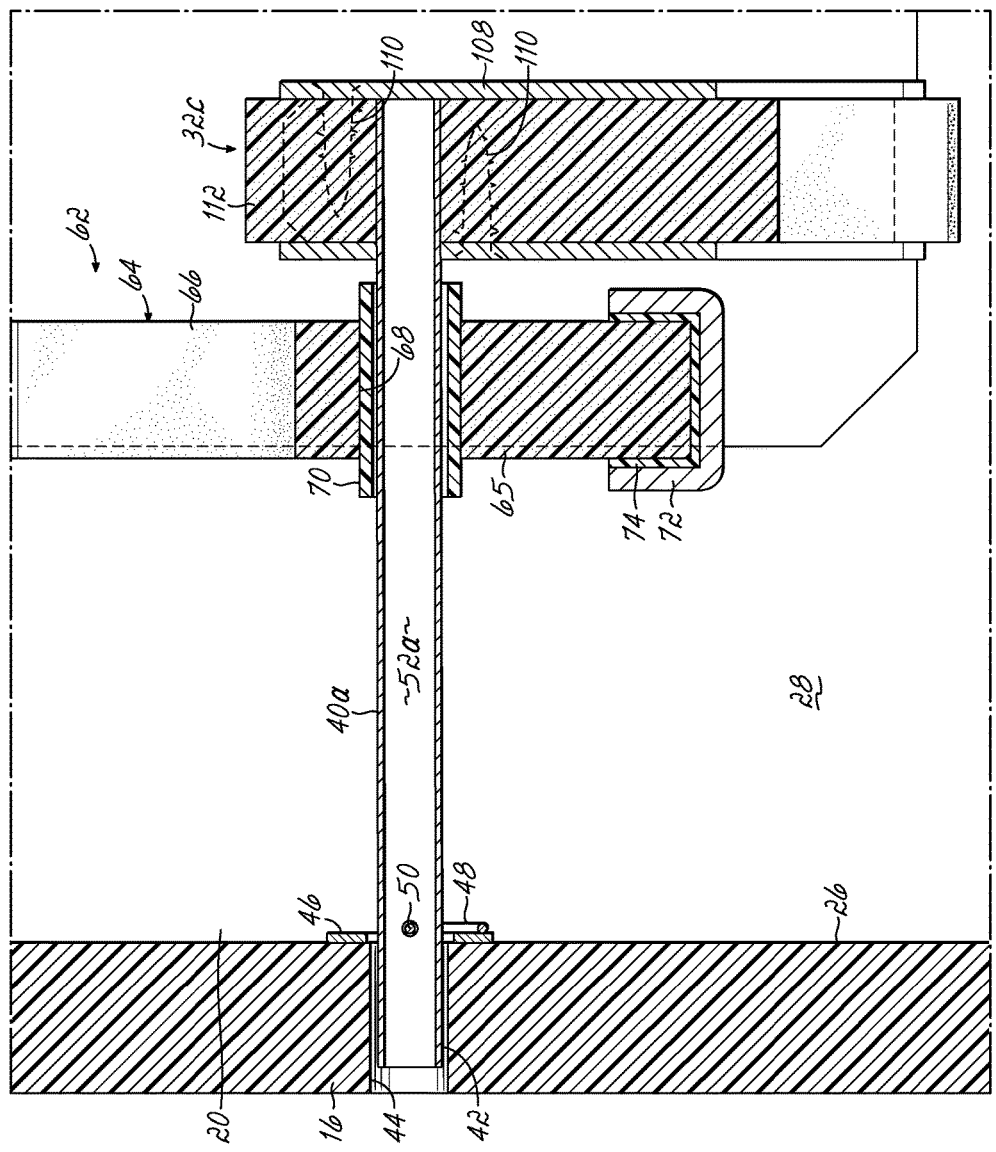
FIG. 17 is a partial cross-sectional view of a portion of the container shown in FIG. 14.

As best shown in FIGS. 16 and 17, each of the supports 32*c* comprises a U-shaped bracket 108 secured with fasteners 110 to a middle body 112. As best shown in FIG. 17, the U-shaped bracket 108 contacts three sides of the body 112. As shown in FIG. 17, the guide 40*a* passes through an opening in one wall of the bracket 108 (the innermost wall) and through the body 112 of the support 32*c*. Thus, each support 32*c* is sized to receive and retain one end of one of the guides 40*a*, as best illustrated in FIG. 17. As shown in FIGS. 16 and 17, the other end of each guide 40*a* extends into a bore 44 in one of the container side walls 16. As shown in FIGS. 3 and 4, a washer 46 is located inside the container side wall 16 surrounding the guide 40*a*. As best shown in FIG. 16, a holder 48 in the form of a triangular metal wire has two ends 50 which fit into holes in the guide 40*a*. The holder 48 at one end of each guide 40*a* functions to hold each guide 40*a* in place. The holder 48 helps prevent the guide 40*a* from moving to the left, as shown in FIG. 16 and discussed herein. The other end of guide 40*a* passes through one of the sides of bracket 108 and through the body 112 of the support 32*c*, abutting the opposed side of bracket 108.

Figure 18:
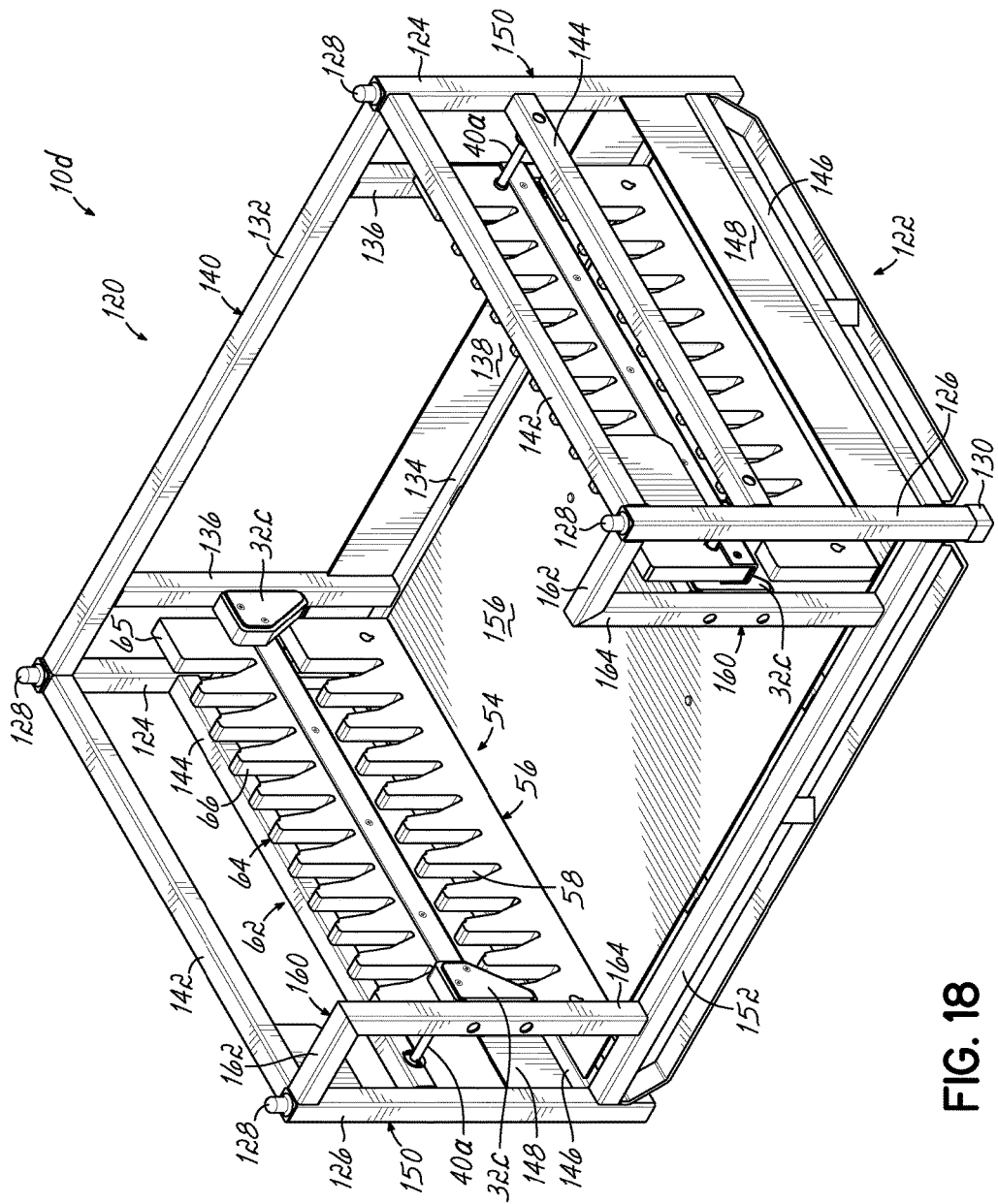
FIG. 18 is a perspective view of another embodiment of a reusable and returnable container.
Figure 19:
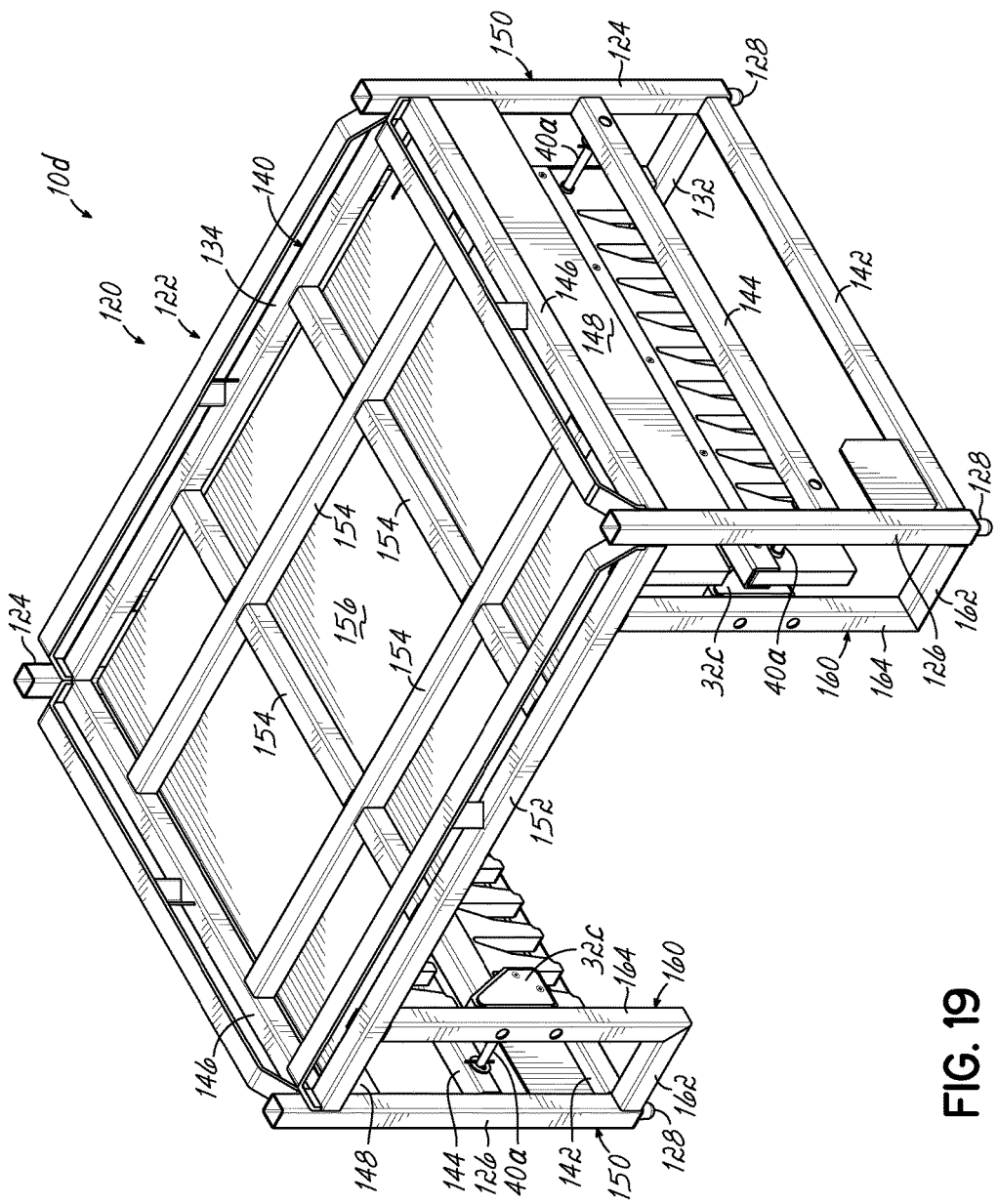
FIG. 19 is a perspective view of the container of FIG. 18 turned upside down.

FIGS. 18-19 illustrate an alternative embodiment of container 10*d*. Container 10*d* is similar to container 10*c* shown in FIGS. 14-17 in that container 10*d* uses the same dunnage, guides 40*a* and supports 32*c* as container 10*c*. However, in container 10*d*, the side structures are not solid walls. As best shown in FIG. 18, container 10*d* comprises an outer metal rack or frame 120 having a bottom 122 and four corner posts, two rear corner posts 124 and two front corner posts 126. As best shown in FIG. 19, each of the corner posts 124 and 126 is generally rectangular in cross-section, has a hollow interior, and a knob 128 at the top thereof for stacking purposes so that multiple containers 10*d* may be stacked upon one another. The knobs 128 of a first container fit inside the hollow interiors of the corner posts of another or second container located above the first container for stacking purposes. If desired, each of the corner posts may have a cap 130 at the bottom thereof (only one being shown in FIG. 18).

The metal frame 120 further comprises an upper rear member 132 and a lower rear member 134 (see FIG. 19) extending between the two rear corner posts 124 and being secured thereto. Two spaced intermediate rear braces 136 extend between the upper and lower rear members 132, 134 and are secured thereto, such as by welding, for example. As shown in FIG. 18, two of the four supports 32*c* are welded or otherwise secured to the intermediate rear braces 136 (one support 32*c* per intermediate rear brace 136). The other two supports 32*c* are welded or otherwise secured to the vertical members 164 of the front gates 160 described below (one support 32*c* per vertical member 164). An intermediate rear panel 138 extends between the two rear corner posts 124 and is secured thereto. These rear members 132, 134, rear panel 138 and rear corner posts 124 define a rear portion or structure 140 of the metal frame 120, intermediate rear panel 138 being above lower rear member 134.

The metal frame 120 further comprises, on each side of the container, side members 142, 144 and 146 extending between one of the rear corner posts 124 and one of the front corner posts 126 and secured thereto. On each side, upper side member 142 is located above intermediate side member 144 and generally co-planar with the upper rear member 132, as shown in FIG. 18. On each side, intermediate side member 144 is located above lower side member 146, lower side member 146 being generally co-planar with the lower rear member 134. As shown in FIG. 18, the four guides 40*a* are secured to the intermediate side members 144, two per side. In addition, each side has a side panel 148 extending between and secured to one of the rear corner posts 124 and one of the front corner posts 126. The side members 142, 144 and 146, side panel 148 and corner posts 124, 126 define a side portion or structure 150 of the metal frame 120.

As best shown in FIG. 19, the bottom 122 of the metal rack 120 further comprises generally co-planar perimeter members defining a rectangle, including lower rear member 134, two lower side members 146 and front floor member 152. Front floor member 152 extends between the two front corner posts 126 and is secured to each of them. Bottom 122 of the metal rack 120 further comprises a plurality of intersecting interior members 154 extending between opposed perimeter members and secured thereto, members 154 comprising part of the bottom 122 of the metal rack 120. Although four interior members 154 are shown in the bottom 122 of the metal rack 120, any number of interior members may be used. Similarly, although the rear and side portions 140, 150 of the metal rack 120 are illustrated as having a certain number of braces or members extending between corner posts, any number of braces or members may extend between corner posts of any desired shape or size.

A floor 156 rests on top of the bottom of the metal outer frame 120. The floor 156 may be made of plastic, wood, metal or any other desired material. Although the floor 156 is illustrated as being one piece or panel, more than one piece or panel may comprise the floor 156 resting on top of the bottom 122 of the metal rack 120.

The metal frame 120 further comprises two front gates 160, one on each side of the container 10*d*. Each front gate 160 comprises a horizontal member 162 secured to one of the front corner posts 126 and being generally co-planar with the upper side members 142 and upper rear member 132. Each front gate 160 further comprises a vertical member 164, the horizontal member 162 and the front floor member 152.

Although the outer metal rack or frame 120 is shown only in FIGS. 18 and 19 with guides 40*a* and supports 32*c*, any of the dunnage systems shown or described herein may be used in a container having an outer metal rack or frame like the outer metal rack or frame 120.

While various embodiments of the present invention have been illustrated and described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A method of unloading products from inside a container, the method comprising:

removing products extending between first and second dunnage components of an upper level of dunnage, at least one of the dunnage components of the upper level of dunnage being movable away from the other dunnage component of the upper level of dunnage;

moving at least one of the dunnage components of the upper level of dunnage from a first position to a second position, the dunnage components of the upper level of dunnage being further away from each other in the second position than in the first position, movement of each of the dunnage components of the upper level of dunnage being limited between stationary guides and stationary supports, two of the stationary supports being secured to a front of the container and two additional stationary supports being secured to a rear of the container, each of the stationary guides extending between one of the stationary supports and a side of the container;

removing products from a lower level of dunnage while the dunnage components of the upper level of dunnage are in their second position.

2. The method of claim 1 wherein the lower level of dunnage is stationary.

3. The method of claim 1 wherein the lower level of dunnage comprises multiple dunnage components.

4. The method of claim 3 wherein the dunnage components of the lower level of dunnage are spaced from each other.

5. The method of claim 1 wherein each of the dunnage components of the upper level of dunnage has notches for retaining product.

6. A method of unloading products from inside a container, the method comprising:

removing products from an upper level of dunnage;

moving dunnage components of the upper level of dunnage from a first position to a second position, the dunnage components of the upper level of dunnage being further away from each other in the second position than in the first position, movement of each of the dunnage components of the upper level of dunnage being limited between stationary guides and stationary supports, two of the stationary supports being secured to a front of the container and two additional stationary supports being secured to a rear of the container, each of the stationary guides extending between one of the stationary supports and a side of the container;

removing products from a lower level of dunnage while the dunnage components of the upper level of dunnage are in their second position.

7. The method of claim 6 wherein the lower level of dunnage is stationary.

8. The method of claim 6 wherein the lower level of dunnage comprises multiple dunnage components.

9. The method of claim 8 wherein the dunnage components of the lower level of dunnage are spaced from each other.

10. The method of claim 6 wherein each of the dunnage components of the upper level of dunnage has notches for retaining product.

11. A method of loading products into a container, the method comprising:

inserting products into a lower level of dunnage while dunnage components of an upper level of dunnage are spaced away from each other in an open position, at least one of the dunnage components of the upper level of dunnage being movable away from another of the dunnage components of the upper level of dunnage;

moving the dunnage components of the upper level of dunnage towards each other into a closed position, movement of each of the dunnage components of the upper level of dunnage being limited between stationary guides and stationary supports, each of the stationary supports being secured to one of a front and rear of the container, each of the stationary guides extending between one of the stationary supports and a side of the container; and inserting products into the upper level of dunnage.

12. The method of claim 11 wherein the lower level of dunnage is stationary while products are loaded.

13. The method of claim 11 wherein inserting products into a lower level of dunnage comprises inserting products into notches in dunnage components of the lower level of dunnage.

14. The method of claim 11 wherein inserting products into a lower level of dunnage comprises inserting products into notches in dunnage components spaced from each other.

15. A method of loading products into a container, the method comprising:

inserting products into a lower level of dunnage while dunnage components of an upper level of dunnage are spaced away from each other in an open position;

moving the dunnage components of the upper level of dunnage towards each other into a closed position, movement of each of the dunnage components of the upper level of dunnage being limited between stationary guides and stationary supports, each of the stationary supports being secured to one of a front and rear of the container, each of the stationary guides extending between one of the stationary supports and a side of the container; and inserting products into the upper level of dunnage.

16. The method of claim 15 wherein the lower level of dunnage is stationary while products are loaded.

17. The method of claim 15 wherein inserting products into the lower level of dunnage comprises inserting products into notches in dunnage components of the lower level of dunnage.

18. The method of claim 15 wherein inserting products into the lower level of dunnage comprises inserting products into notches in dunnage components spaced from each other.

19. The method of claim 15 wherein inserting products into the lower level of dunnage comprising passing products between dunnage components of the upper level of dunnage.

20. The method of claim 15 wherein inserting products into a lower level of dunnage comprises inserting products between foam dunnage components of an upper level of dunnage.

* * * * *